(12) United States Patent
Kim et al.

(10) Patent No.: US 10,986,562 B2
(45) Date of Patent: Apr. 20, 2021

(54) METHOD AND TERMINAL FOR CARRYING OUT ACCESS CONTROL IN 5TH GENERATION MOBILE COMMUNICATION SYSTEM

(71) Applicant: LG ELECTRONICS INC., Seoul (KR)

(72) Inventors: Jaehyun Kim, Seoul (KR); Youngdae Lee, Seoul (KR); Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/475,330

(22) PCT Filed: Jan. 5, 2018

(86) PCT No.: PCT/KR2018/000247
§ 371 (c)(1),
(2) Date: Jul. 1, 2019

(87) PCT Pub. No.: WO2018/128458
PCT Pub. Date: Jul. 12, 2018

(65) Prior Publication Data
US 2019/0342821 A1    Nov. 7, 2019

Related U.S. Application Data

(60) Provisional application No. 62/442,990, filed on Jan. 6, 2017, provisional application No. 62/490,533, filed (Continued)

(51) Int. Cl.
*H04W 4/00* (2018.01)
*H04W 48/06* (2009.01)
(Continued)

(52) U.S. Cl.
CPC ....... *H04W 48/06* (2013.01); *H04W 74/0833* (2013.01); *H04W 76/10* (2018.02);
(Continued)

(58) Field of Classification Search
None
See application file for complete search history.

(56) References Cited

U.S. PATENT DOCUMENTS

2014/0128029 A1*  5/2014  Fong ..................... H04W 48/10
                                                    455/411
2015/0036489 A1   2/2015  Rajadurai et al.
(Continued)

FOREIGN PATENT DOCUMENTS

KR    10-2016-0128342 A    11/2016
WO       2014/084596 A1     6/2014
(Continued)

*Primary Examiner* — Phuongchau Ba Nguyen
(74) *Attorney, Agent, or Firm* — Dentons US LLP

(57) ABSTRACT

Provided is a method for a terminal for carrying out access control according to one disclosure of the present specification. The method may comprise the steps of: an access stratum (AS) layer of the terminal transmitting, to a base station, a radio resource control (RRC) message comprising one or more from among an access category, call type, and setup reason if the determination is for no disconnection to occur as a result of carrying out a termination test for access control; and receiving an RRC reject message or RRC connection drop message from the base station if the network is overloaded or congested. One or more from among the access category, call type, and setup reason included in the RRC message can be utilized to determine whether the base station is to transmit the RRC reject message or RRC connection drop message when the network is overloaded or congested.

10 Claims, 24 Drawing Sheets

Related U.S. Application Data on Apr. 26, 2017, provisional application No. 62/545,430, filed on Aug. 14, 2017, provisional application No. 62/545,487, filed on Aug. 15, 2017, provisional application No. 62/564,317, filed on Sep. 28, 2017, provisional application No. 62/572,584, filed on Oct. 16, 2017, provisional application No. 62/586,136, filed on Nov. 14, 2017.

(51) Int. Cl.
*H04W 76/25* (2018.01)
*H04W 76/18* (2018.01)
*H04W 76/30* (2018.01)
*H04W 76/27* (2018.01)
*H04W 76/10* (2018.01)
*H04W 74/08* (2009.01)

(52) U.S. Cl.
CPC ........... *H04W 76/18* (2018.02); *H04W 76/25* (2018.02); *H04W 76/27* (2018.02); *H04W 76/30* (2018.02)

(56) References Cited

U.S. PATENT DOCUMENTS

| | | |
|---|---|---|
| 2015/0223144 A1 | 8/2015 | Lee et al. |
| 2015/0223146 A1 | 8/2015 | Pinheiro et al. |
| 2015/0249951 A1 | 9/2015 | Jung et al. |
| 2015/0304937 A1 | 10/2015 | Kim et al. |
| 2016/0262068 A1 | 9/2016 | Won et al. |
| 2016/0330648 A1 | 11/2016 | Hwang et al. |
| 2017/0230898 A1 | 8/2017 | Hapsari et al. |
| 2017/0324574 A1 | 11/2017 | Huang-Fu et al. |
| 2018/0007720 A1 | 1/2018 | Shu et al. |
| 2018/0359681 A1 | 12/2018 | Futaki |
| 2019/0268824 A1 | 8/2019 | Kubota et al. |
| 2019/0320254 A1 | 10/2019 | McElveen et al. |
| 2019/0342821 A1* | 11/2019 | Kim ............... H04W 76/18 |

FOREIGN PATENT DOCUMENTS

| | | | |
|---|---|---|---|
| WO | 2016/024832 A1 | 2/2016 | |
| WO | 2016/076603 A1 | 5/2016 | |
| WO | 2016/122830 | * 8/2016 | ............ H04W 76/27 |

* cited by examiner

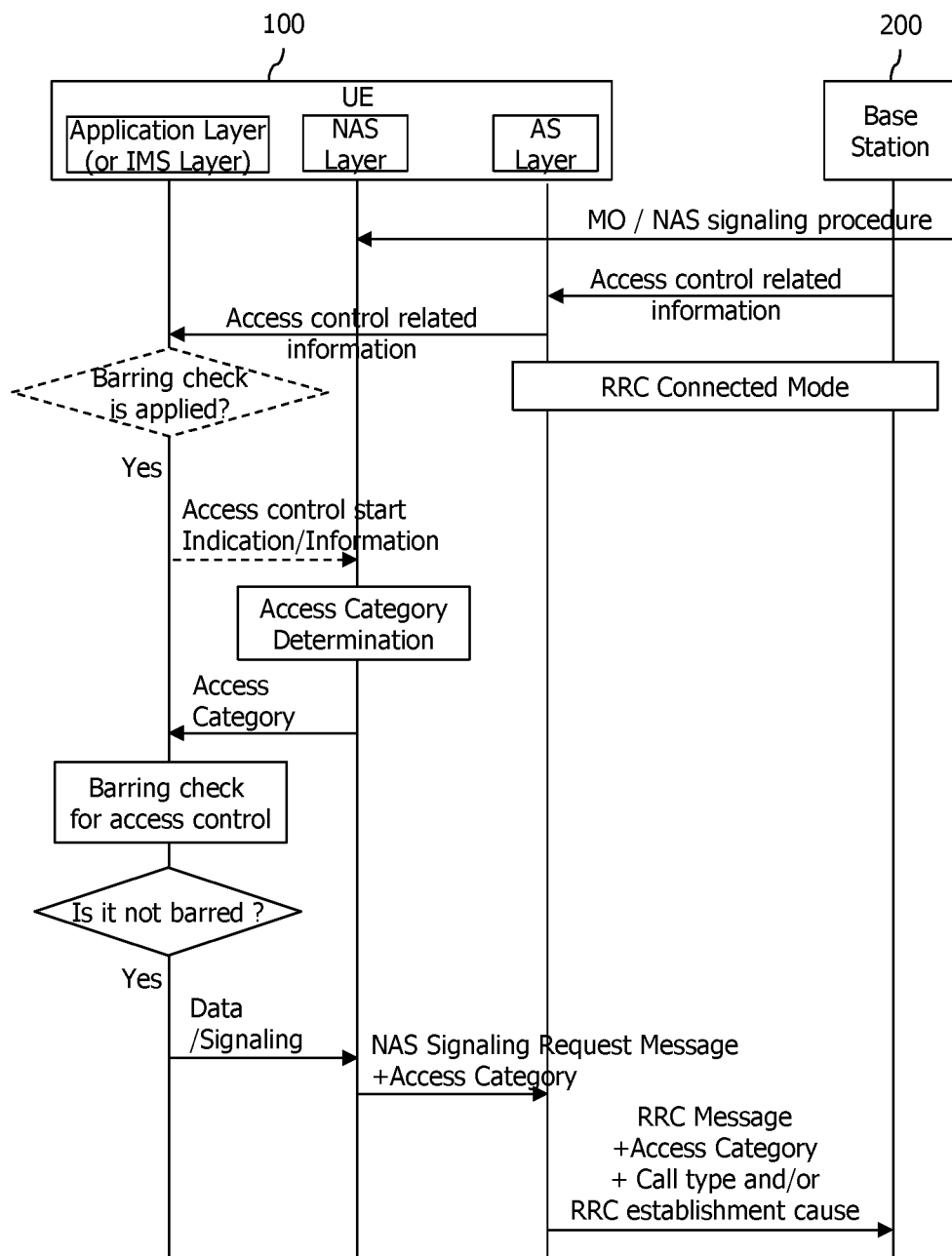

METHOD AND TERMINAL FOR CARRYING OUT ACCESS CONTROL IN 5TH GENERATION MOBILE COMMUNICATION SYSTEM

CROSS-REFERENCE TO RELATED APPLICATIONS

This application is the National Stage filing under 35 U.S.C. 371 of International Application No. PCT/KR2018/000247, filed on Jan. 5, 2018, which claims the benefit of U.S. Provisional Applications No. 62/442,990 filed on Jan. 6, 2017, No. 62/490,533 filed on Apr. 26, 2017, No. 62/545,430 filed on Aug. 14, 2017, No. 62/545,487 filed on Aug. 15, 2017, No. 62/564,317 filed on Sep. 28, 2017, No. 62/572,584 filed on Oct. 16, 2017, and No. 62/586,136 filed on Nov. 14, 2017, the contents of which are all hereby incorporated by reference herein in their entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRScore and the S-GW. Furthermore, if a direct tunnel is not established, the reference point provides user plane tunneling |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

In a conventional 4th generation communication system, i.e., a long term evolution (LTE)/LTE-Advanced (LTE-A) system, various access control mechanisms (e.g., ACB, EAB, ACDC, SSAC) were developed.

Due to success of 4th generation mobile communication, interest in next generation, i.e., 5th generation (so-called 5G) mobile communication has increased and a study thereof is also being conducted.

However, to apply the existing access control mechanism to a 5th generation (so-called 5G) mobile communication has an inefficient problem.

SUMMARY OF THE INVENTION

Accordingly, an object of the present invention is to present a method that can solve the aforementioned problem.

In order to achieve the above-described object, disclosures of the present invention provide an access control mechanism for 5th generation (so-called 5G) mobile communication.

Specifically, in order to achieve the above-described object, in an aspect, a method of performing access control by a terminal is provided. The method includes transmitting, when it is determined to not bar as a result of a barring check for access control, by an Access Stratum (AS) layer of a terminal, a Radio Resource Control (RRC) message including at least one of an access category, a call type, and an establishment cause to a base station; and receiving a RRC reject message or an RRC disconnection message from the base station in a network overload or congestion situation. At least one of the access category, the call type, and the establishment cause included in the RRC message is used when the base station determines whether to transmit the RRC reject message or the RRC disconnection message in the network overload or congestion situation.

The method may further include requesting and obtaining, by the AS layer of the terminal, access category mapping information to a Non-Access Stratum (NAS) layer of the terminal, when transmission of the RRC message is required; determining, by the AS layer of the terminal, an access category of the RRC message based on the access category mapping information obtained from the NAS.

The method may further include receiving, by the AS layer of the terminal, access control related information from the base station; independently obtaining, by the AS layer of the terminal, access category mapping information based on access control related information received from the base station, when transmission of the RRC message is required; and determining, by the AS layer of the terminal, an access category of the RRC message based on the independently obtained access category mapping information.

When transmission of an NAS signaling request message is not requested from the NAS layer of the terminal, transmission of the RRC message may be independently requested by the AS layer of the terminal.

The method may further include transferring, by the AS layer of the terminal, information on radio access technology (RAT) of the currently accessed base station to an NAS layer of the terminal; transferring, by the NAS layer, at least one of the call type and the establishment cause to the AS layer, when RAT of the base station is long term evaluation (LTE) or LTE-Advanced; and transferring, by the NAS layer, the access category to the AS layer, when RAT of the base station is new RAT (NR).

The method may further include performing, by the AS layer of the terminal, a barring check for access control based on at least one of the call type and the establishment cause, when at least one of the call type and the establishment cause is obtained from the NAS layer; and performing, by the AS layer of the terminal, a barring check for access control based on the access category, when the access category is obtained from the NAS layer.

The method may further include determining, when RAT of the currently accessed base station is LTE or LTE-Advanced, but when an access category is obtained from the NAS layer, by the AS layer, at least one of the call type and the establishment cause based on the access category.

When the base station receives an overload control start command in the network overload or congestion situation, the RRC reject message or the RRC disconnection message may be transmitted from the base station.

The method may further include driving, when the RRC reject message or the RRC disconnection message includes a wait time value, by the AS layer, a timer based on the wait time value.

The method may further include transferring, by the AS layer, a rejection indication or a failure indication including the wait time value to the NAS layer; and driving, the NAS layer, the timer based on the wait time value.

The method may further include receiving, by the AS layer, the access control related information from the network. The access control related information may be further considered in the barring check for access control.

In order to achieve the above-described object, in another aspect, a terminal for performing access control is provided. The terminal includes a transceiver; and a processor configured to control the transceiver and drive an Access Stratum (AS) layer and a Non-Access Stratum (NAS) layer. When it is determined not to bar as a result of a barring check for access control, the AS layer transmits a Radio Resource Control (RRC) message including at least one of an access category, a call type, and an establishment cause to a base station. The AS layer receives an RRC reject message or an RRC disconnection message from the base station in a network overload or congestion situation. At least one of the access category, the call type, and the establishment cause included in the RRC message is used when the base station determines whether to transmit the RRC reject message or RRC disconnection message in the network overload or congestion situation.

According to the present disclosure, the aforementioned problems of the related art may be solved.

BRIEF DESCRIPTION OF THE DRAWINGS

FIG. 20 is a signal flow diagram illustrating an exemplary procedure according to a second scheme of a fourth disclosure.

DESCRIPTION OF EXEMPLARY EMBODIMENTS

Figure 1:
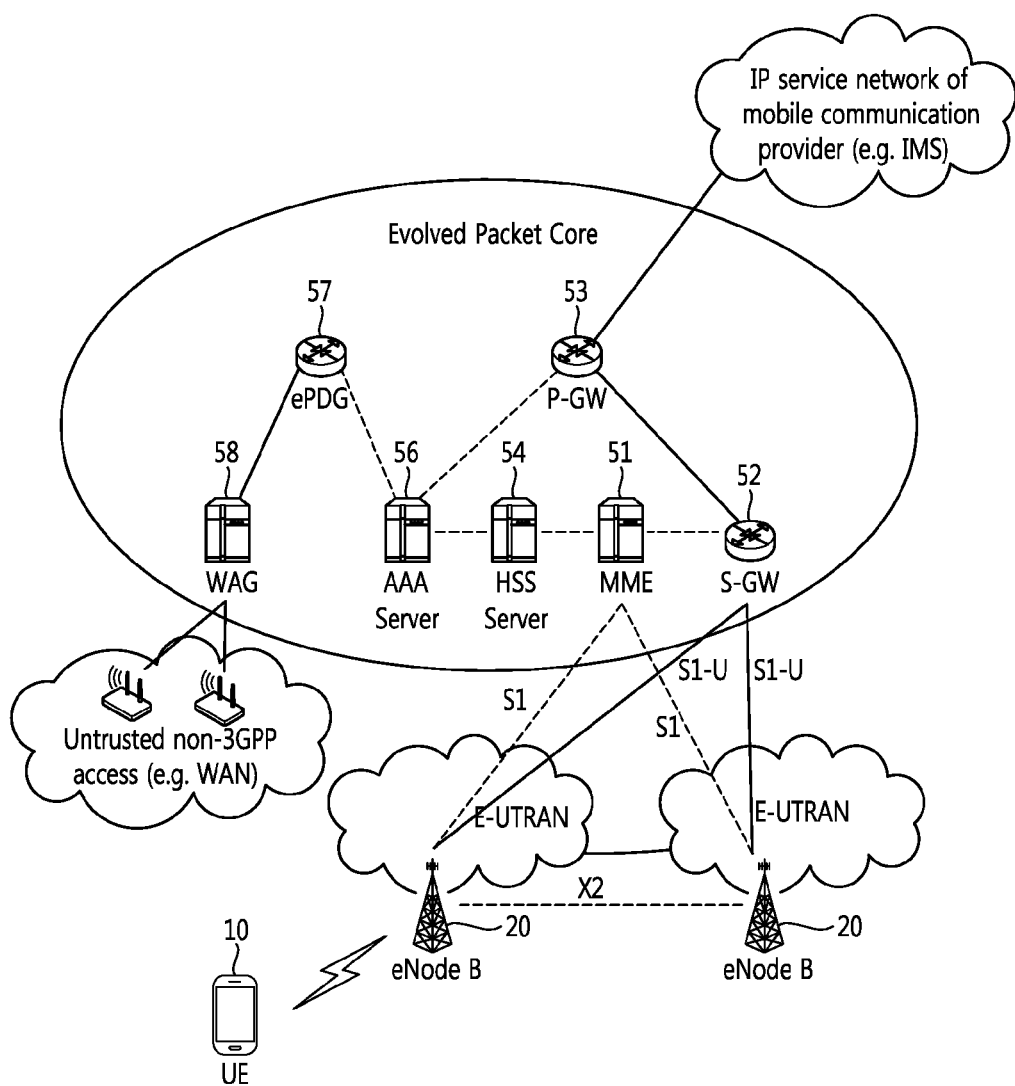
FIG. 1 is a structural diagram of an evolved mobile communication network.
Figure 2:
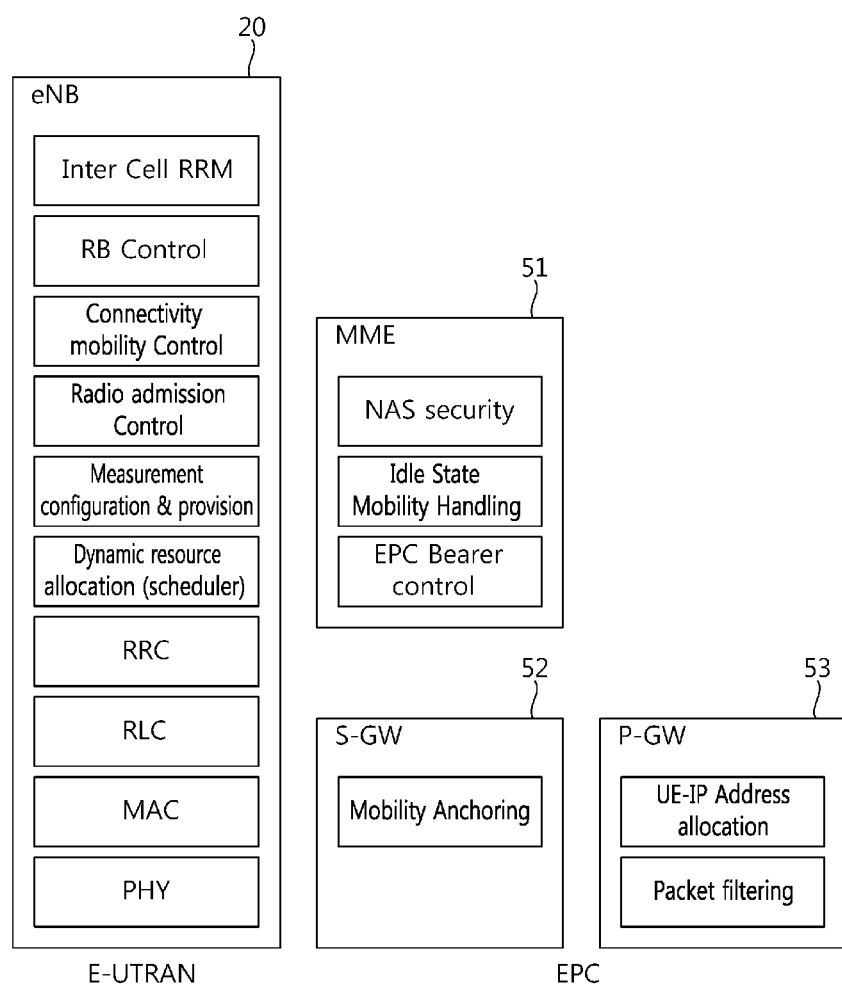
FIG. 2 is an exemplary diagram illustrating architectures of a general E-UTRAN and a general EPC.
Figure 3:
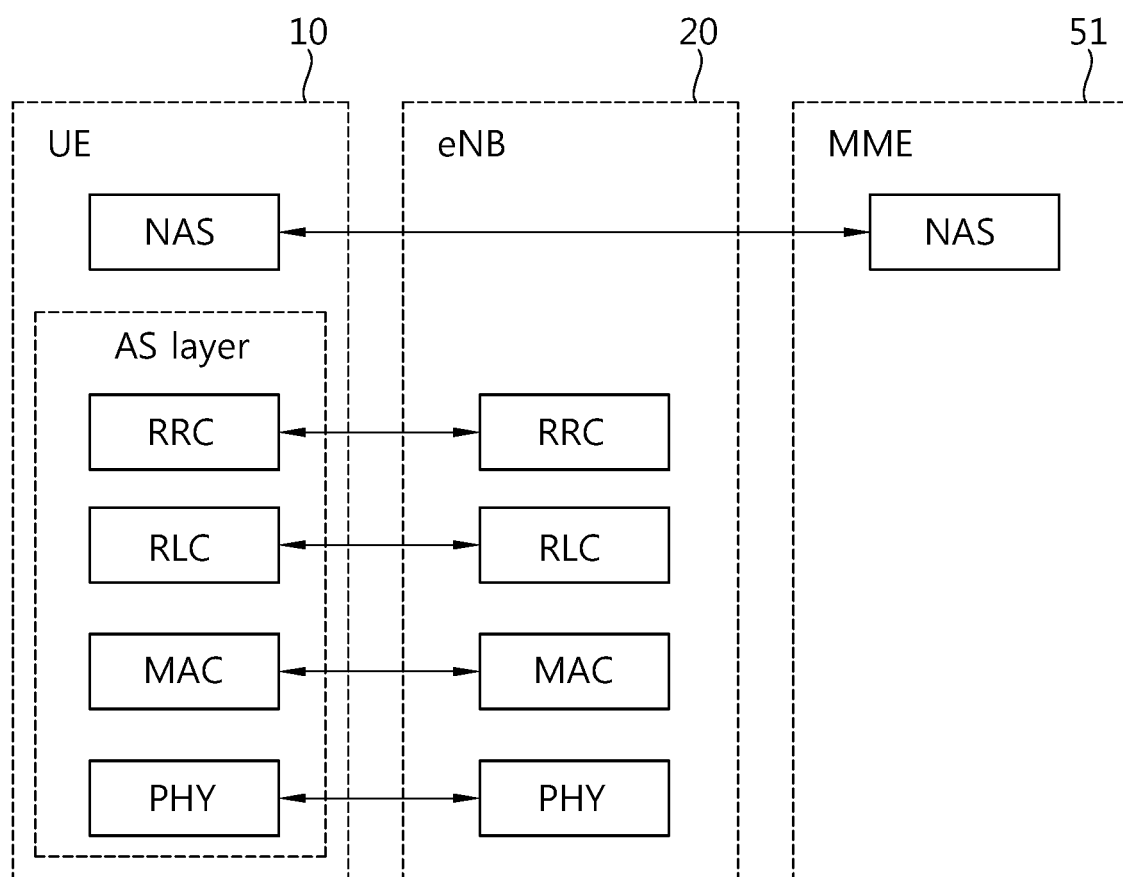
FIG. 3 is an exemplary diagram illustrating a structure of a radio interface protocol on a control plane between UE and eNodeB.
Figure 4:
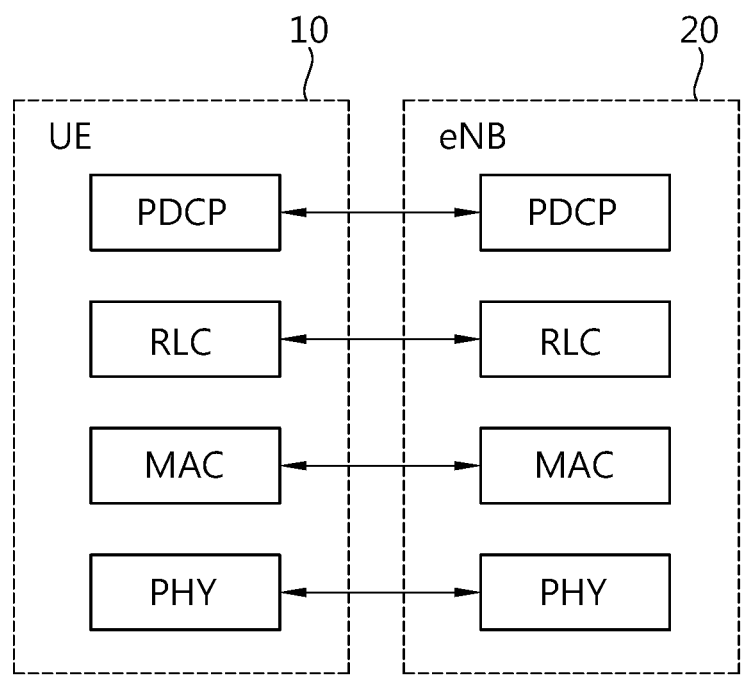
FIG. 4 is another exemplary diagram illustrating a structure of a radio interface protocol on a user plane between the UE and a base station.
Figure 5A:
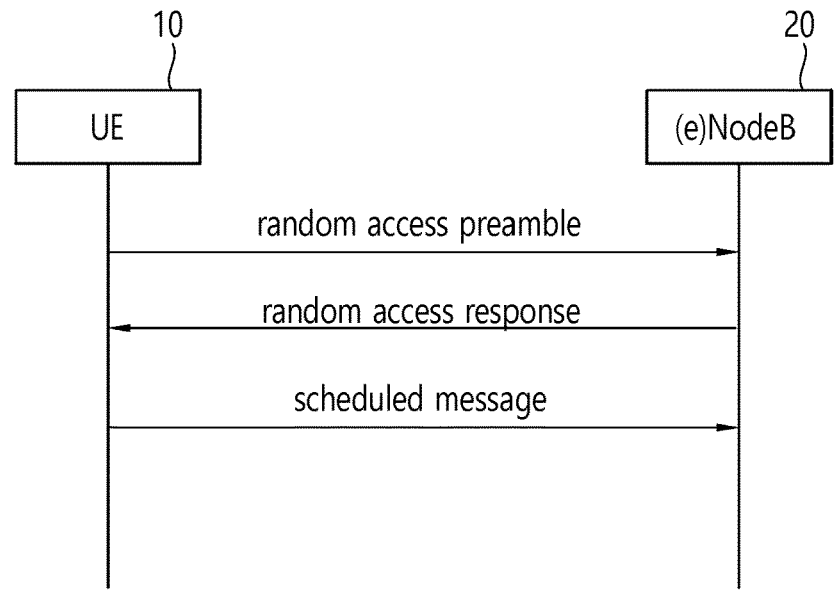
FIG. 5a is a flowchart illustrating a random access process in 3GPP LTE.
Figure 5B:
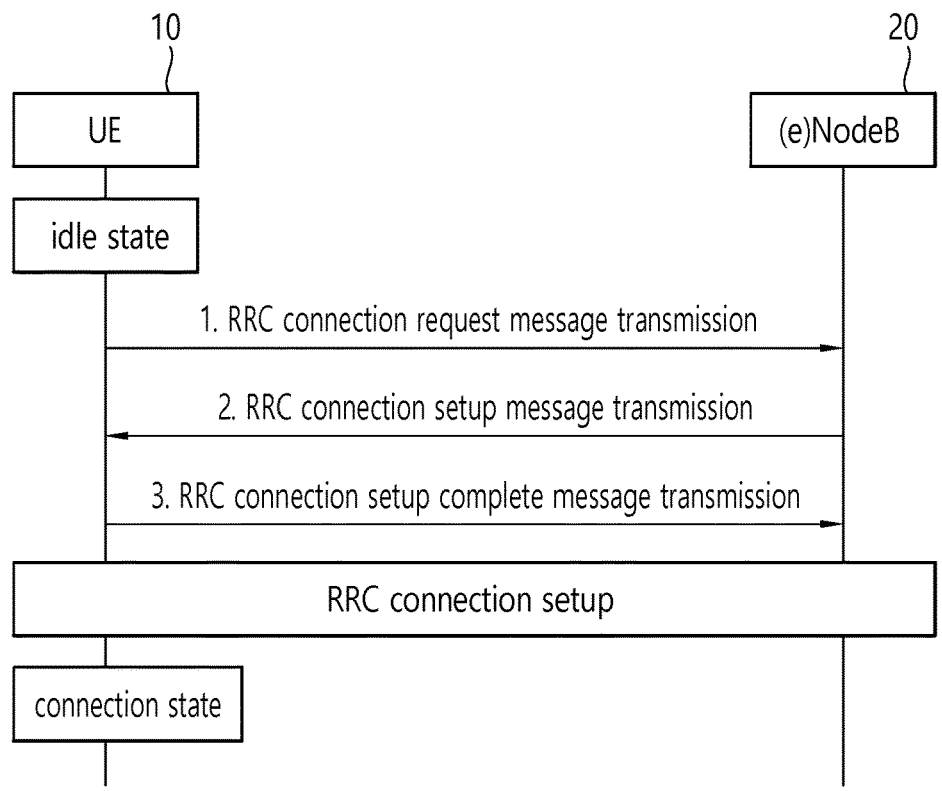
FIG. 5b illustrates a connection process in a radio resource control (RRC) layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including a UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

MM (Mobility Management) operation/procedure: An operation or procedure for mobility regulation/management/control of the UE. The MM operation/procedure may be interpreted as including one or more of an MM operation/procedure in a CS network, a GMM operation/procedure in a GPRS network, and an EMM operation/procedure in an EPS network. The UE and the network node (e.g., MME, SGSN, and MSC) exchange an MM message to perform the MM operation/procedure.

SM (Session Management) operation/procedure: An operation or procedure for regulating/managing/processing/handling a user plane and/or a bearer context/PDP context of the UE. The SM operation/procedure may be interpreted as including one or more of an SM operation/procedure in a GPRS network and an ESM operation/procedure in an EPS network. The UE and the network node (e.g., MME and SGSN) exchange an SM message to perform the SM operation/procedure.

Low priority UE: A UE configured for NAS signalling low priority. The standard document 3GPP TS 24.301 and TS 24.008 may be incorporated by reference for details thereof.

Normal priority UE: A normal UE not configured with low priority.

Dual priority UE: A UE configured for dual priority. That is, a UE which provides dual priority support is configured for a NAS signalling low priority and also configured to override the NAS signalling low priority indicator. The standard document 3GPP TS 24.301 and TS 24.008 may be incorporated by reference for details thereof.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

CIoT: An abbreviation of Cellular Internet of Things, and means performing based on IoT communication.

Narrowband-IoT: It refers to radio access technology (RAT) improved in 3GPP for CIoT. That is, it is a network operating at a bandwidth of up to 180 kHz (corresponding to one PRB).

Hereinafter, an aspect of the present specification is described with reference to the accompanying drawings.

Figure 6:
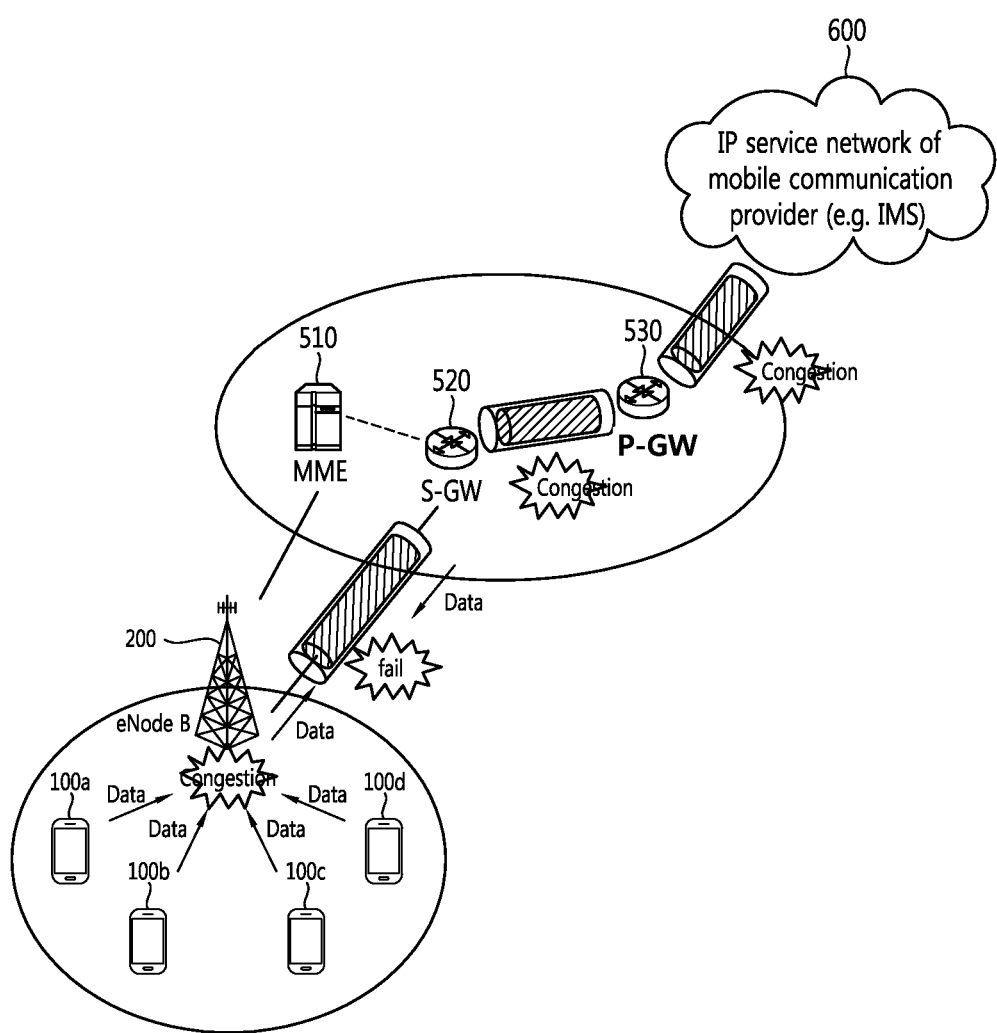
FIG. 6 shows a network overload state.

FIG. 6 shows a network overload state.

As shown in FIG. 6, many UEs 100*a*, 100*b*, 100*c*, and 100*d* are present in the coverage of an eNodeB 200, and data transmission/reception is attempted. Accordingly, if traffic is overloaded or congested in an interface between the eNodeB 200 and an S-GW 520, downlink data to the MTC device 100 or uplink data from the UE 100 is not correctly transmitted and thus data transmission fails.

Alternatively, even if an interface between the S-GW 520 and a PDN-GW 530 or an interface between the PDN-GW 530 and an Internet Protocol (IP) service network of a mobile communication operator is overloaded or congested, downlink data to the UEs 100*a*, 100*b*, 300*c*, and 300*d* or uplink data from the UEs 100*a*, 100*b*, 300*c*, and 300*d* is not correctly transmitted and thus data transmission fails.

If an interface between the eNodeB 200 and the S-GW 520 is overloaded or congested or if an interface between the S-GW 520 and the PDN-GW 530 is overloaded or congested, a node (e.g., MME) of the core network performs a NAS level congest control to avoid or control signaling congestion and APN congestion.

The NAS level congestion control consists of an APN based congestion control and a general NAS level mobility management control.

The APN based congestion control implies an EMM, GMM, and (E)SM signal congestion control related to a UE and a specific APN (i.e., an APN related to a congestion state), and includes an APN based session management congestion control and an APN based mobility management congestion control.

On the other hand, the general NAS level mobility management control implies that a node (MME, SGSN) in the core network rejects a mobility management signaling request which is requested by the UE/MS in a general network congestion or overload situation to avoid the congestion and the overload.

In general, if the core network performs the NAS level congestion control, a back-off timer value is transmitted to a UE in an idle mode or a connected mode by being carried on a NAS reject message. In this case, the UE does not request an EMM/GMM/(E)SM signal to the network until the back-off timer expires. The NAS reject message is one of an Attach reject, a Tracking Area Updating (TAU) reject, a Routing Area Updating (RAU) reject, a service reject, an extended service reject, a PDN connectivity reject, a bearer resource allocation reject, a bearer resource modification reject, and a deactivate EPS bearer context request reject.

The back-off timer may be classified into a Mobility Management (MM) back-off timer and a Session Management (SM) back-off timer.

The MM back-off timer operates independently for each UE, and the SM back-off timer operates independently for each APN and each UE.

Simply, the MM back-off timer is for controlling an EMM/GMM signal (e.g., Attach, TAU/RAU request, etc.). The SM back-off timer is for controlling an (E)SM signal (e.g., PDN connectivity, Bearer Resource Allocation, Bearer Modification, PDP Context Activation, PDP Context Modification request, etc.).

More specifically, the MM back-off timer is a mobility management related back-off timer used to control a case where a network congestion occurs, and is a timer which prevents the UE from performing an attach, location information update (TAU, RAU), and service request procedure during the timer is running. However, exceptionally in case of an emergency bearer service and a Multimedia Priority Service (MPS), the UE may be allowed to perform the request even if the timer is running.

As described above, the UE may receive the MM back-off timer value from a core network node (e.g., MME, SGSN, etc.) or from a lower layer (access stratum). In addition, the timer value may be randomly set by the UE within the range of 15 minutes to 30 minutes.

The SM back-off timer is a session management related back-off timer used to control a case where a network congestion occurs, and is a timer which prevents the UE from configuring or changing an associated APN-based session. However, likewise, exceptionally in case of an emergency bearer service and a Multimedia Priority Service (MPS), the UE 100 may be allowed to perform the request even if the timer is running.

The UE receives the SM back-off timer value from the core network node (e.g., MME, SGSN, etc.), and is randomly set within up to 72 hours. In addition, the timer value may be randomly set by the UE/MS within the range of 15 minutes to 30 minutes.

On the other hand, when the congestion occurs in the eNodeB 200, the eNodeB 200 may perform congestion control. That is, when the UE requests RRC connection establishment for data transmission of the user plane, if the eNodeB 200 is in the congest state, the eNodeB 200 may transmit a reject response to the UE together with an extended wait timer. In this case, the RRC connection establishment request may not be re-attempted until the extended wait timer expires. On the contrary, when the UE requests the RRC connection for transmitting the signal of the control plane for circuit switch (CS)-based call reception, even though the eNodeB 200 is in the congest state, the RRC connection request may not be rejected.

Figure 7:
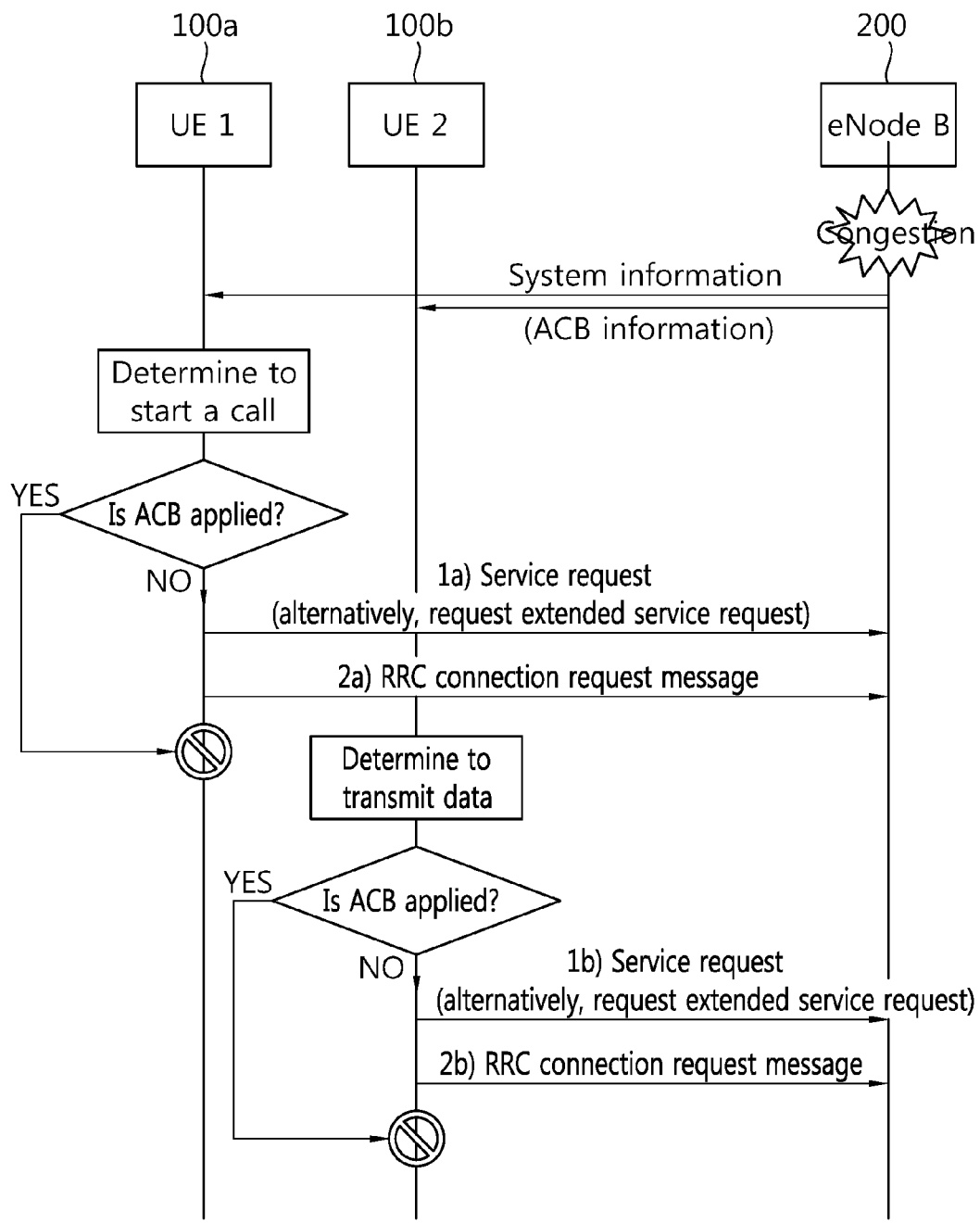
FIG. 7 is an exemplary flowchart illustrating an access barring operation in a network congested state.

FIG. 7 is an exemplary flowchart illustrating an access barring operation in a network congested state.

As illustrated in FIG. 7*a*, in the overload or congest state of the network or the eNodeB 200, the eNodeB 200 may broadcast access class barring (ACB)-related information through system information. The system information may be system information block (SIB) type 2.

The SIB type 2 may include ACB-related information like the following table.

TABLE 2

| Field | Description |
| --- | --- |
| ac-BarringFactor | When a random value generated by the UE is smaller than a value of ac-BarringFactor, access is allowed. If not, the access is barred. |
| ac-BarringForCSFB | ACB for circuit switch (CS) fallback. The CS fallback converts a VoLTE call to a previous 3G call. |
| ac-BarringForEmergency | ACB for emergency service |
| ac-BarringForMO-Data | ACB for mobile orienting data |
| ac-BarringForMO-Signalling | ACB for mobile orienting control signal |
| ac-BarringForSpecialAC | ACB for specific access classes, that is, 11 to 15. |
| ac-BarringTime | Represents time when the access is barred. |
| ssac-BarringForMMTEL-Video | ACB for each service for mobile orienting of MMTEL video. |
| ssac-BarringForMMTEL-Voice | ACB for each service for mobile orienting of MMTEL voice. |

Meanwhile, UE1 100*a* determines an IMS service, for example, mobile orienting of a call by VoLTE and generates a service request message. Similarly, UE2 100*b* determines mobile orienting of general data and generate the service request message.

Sequentially, the UE1 100*a* generates an RRC connection request message. Similarly, the UE2 100*b* generate the RRC connection request message.

Meanwhile, the UE1 100*a* performs access barring check (that is, whether the ACB is applied). Similarly, the UE2 100*b* performs access barring check (that is, whether the ACB is applied).

If the ACB is not applied, the UE1 100*a* and the UE2 100*b* may transmit a service request (alternatively, an extended service request) message and the RRC connection request message, respectively. However, when the ACB is applied, both the UE1 100*a* and the UE2 100*b* may not transmit the RRC connection request message, respectively.

The access barring check will be described in detail as follows. Generally, at least one of 10 access classes (for example, AC0, AC1, . . . , and AC9) is randomly allocated to the UE. Exceptionally, for urgent emergency access, AC10 is allocated. As such, the value of the randomly allocated access class may be stored in each USIM of the UE1 100*a* and the UE2 100*b*. Then, the UE1 100*a* and the UE2 100*b* verify whether the access barring is applied, by using a barring factor included in the received ACB-related information, based on the stored access class. The access barring check is performed in each access stratum (AS) layer, that is, an RRC layer of the UE1 100*a* and the UE2 100*b*.

The access barring check will be described in more detail as follows.

The ac-BarringPerPLMN-List is included in the SIB type 2 received by each of the UE1 100*a* and the UE2 100*b*, and in the case where AC-BarringPerPLMN entry matched with plmn-identityIndex corresponding to the PLMN selected in an higher layer is included in the ac-BarringPerPLMN-List, AC-BarringPerPLMN entry matched with the plmn-identityIndex corresponding to the PLMN selected by the higher layer is selected.

Next, when the UE1 100*a* and the UE2 100*b* perform the RRC connection request, the access barring check is performed by using T303 as Tbarring and using ac-BarringForMO-Data as a barring parameter.

When the barring is determined, each AS(RRC) layer of the UE1 100*a* and the UE2 100*b* notifies a failure of the RRC connection establishment to the higher layer.

Subsequently, as such, when the access is barred, each AS(RRC) layer determines whether a T302 timer or a Tbarring timer is driving. If the timer is not driving, the T302 timer or the Marring timer is driven.

Meanwhile, while the T302 timer or a Marring timer is driving, the AS(RRC) layer considers that all the access to the corresponding cell is barred.

As described above, in the network overload and congest situation, the eNB/RNC provides the ACB-related information to the UE. Then, the UE checks the access barring by using the barring factor included in the received ACB information based on its access class stored in the USIM. Through the access barring check, finally, an access attempt is not performed. That is, when the access to the corresponding cell is barred through the access barring check, the UE does not attempt the access, and when the access to the corresponding cell is not barred, the UE attempts the access. The access barring check is performed in the AS layer. Herein, the access attempt means that the AS(RRC) layer of the UE transmits the RRC connection request message to the eNB/RNC.

Meanwhile, an access barring check is performed with respect to a normal Mobile Originating (MO) service, for example, an originating call, an originating data, an originating IMS voice and an originating IMS video. That is, ACB is applied accesses of all application programs (however, except a response to an urgent service or paging).

Figure 8:
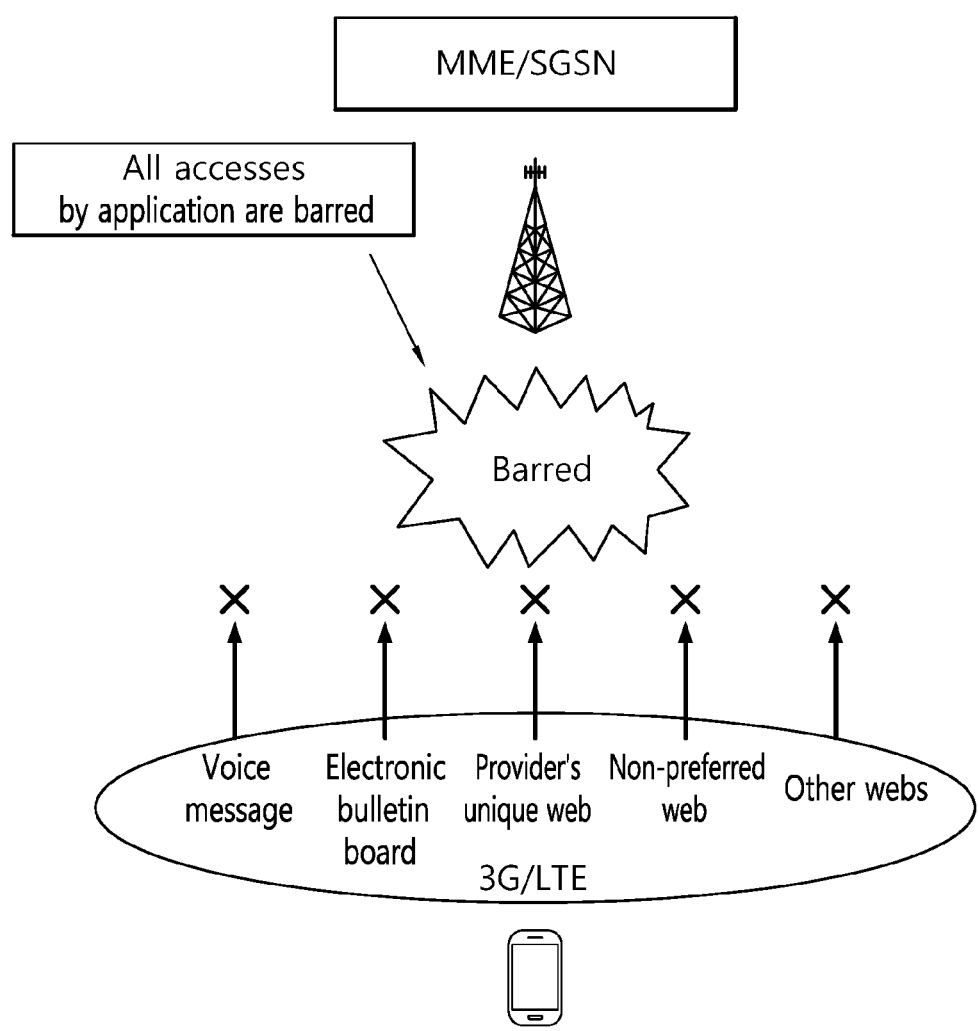
FIG. 8 illustrates an example that all accesses by all applications are barred when ACB is applied.

FIG. 8 illustrates an example that all accesses by all applications are barred when ACB is applied.

As can be seen with reference to FIG. 8, when it is determined to apply ACB once, accesses by all applications of UE (however, except a response to an urgent service or paging) are barred.

As such, accesses by all applications are barred, a differentiated service is unavailable. Such a problem causes network resource waste and degrades user experience, consequently.

Accordingly, in a situation of network overload and a congested situation, a method is required for differentiating Mobile Originating service (e.g., mobile originating voice call or mobile originating data) for each of specific application groups/categories. However, there has been no method for implementing it in the conventional art.

<Introduction of Application Specific Congestion Control Data Communication (ACDC)>

As a method for differentiating a normal Mobile Originating (MO) service, for example, an originating call, an originating data, an originating IMS voice and an originating IMS video, the Application specific Congestion control for Data Communication (ACDC) is proposed.

Figure 9:
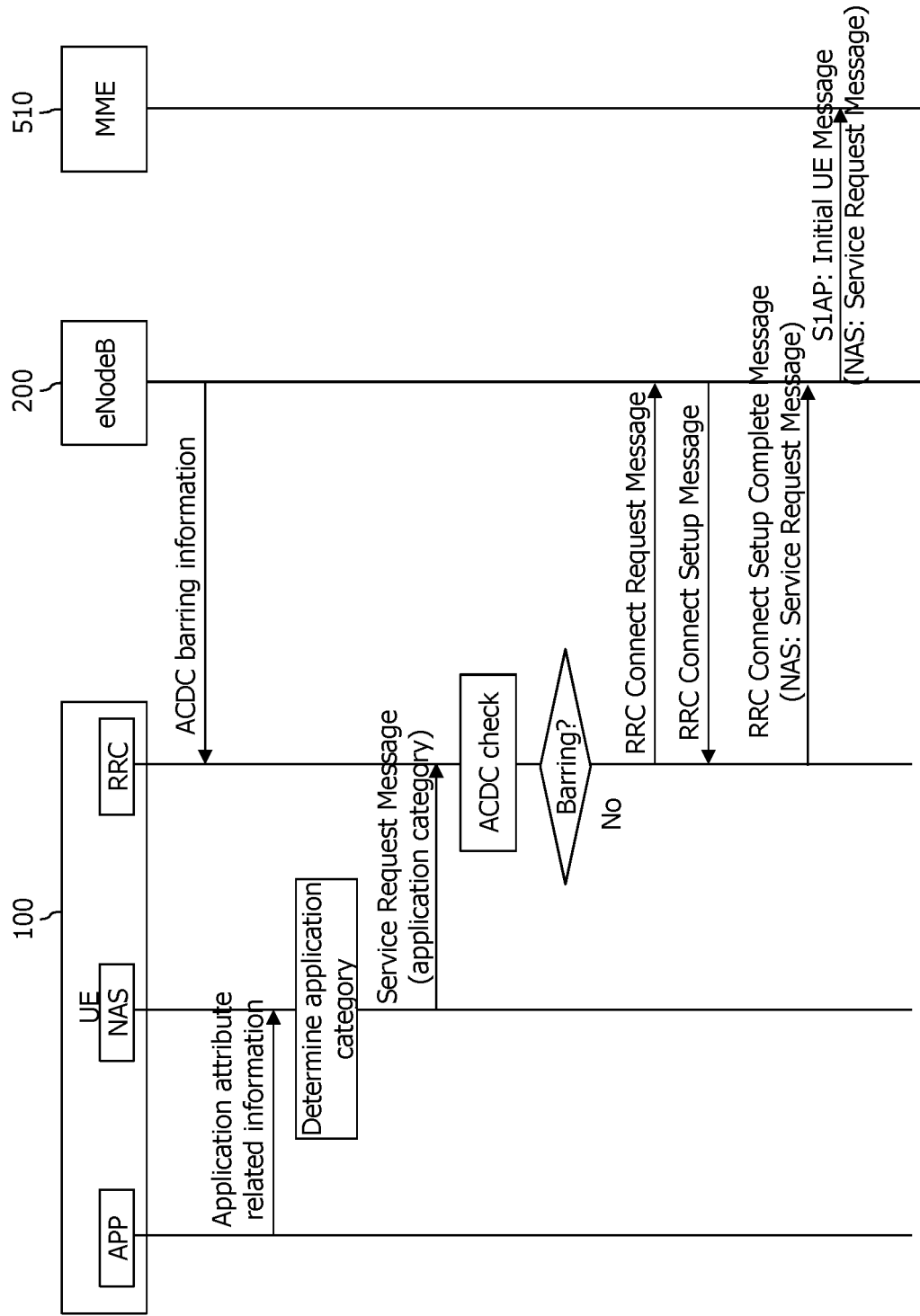
FIG. 9 is a signal flowchart illustrating a procedure according to the ACDC.

FIG. 9 is a signal flowchart illustrating a procedure according to the ACDC.

The procedure is described with reference to FIG. 9 as below.

First, a network (e.g., eNB) may provide ACDC barring information to a UE through SIB.

Meanwhile, in the case that a specific application is executed in the UE 100 and a data communication service is requested by the specific application, the application layer that manages the execution of the specific application provides application attribute related information to a NAS layer.

Then, the NAS layer of the UE 100 determines an application category for the ACDC based on the application attribute related information received from the application layer.

Subsequently, when the NAS layer of the UE 100 starts a service request procedure for service connection (a transmission of SERVICE REQUEST message or a transmission of EXTENDED SERVICE REQUEST message), the NAS layer of the UE 100 forwards the information for the application category to an AS layer (i.e., RRC layer).

Before the AS layer (i.e., RRC layer) of the UE 100 performs the service request procedure of the NAS layer (a transmission of SERVICE REQUEST message or a transmission of EXTENDED SERVICE REQUEST message), based on the category of the application and the ACDC barring information received from the network, the AS layer (i.e., RRC layer) of the UE 100 performs the ACDC barring check, and accordingly, determines whether to permit the service request procedure or not.

In the case that the service request procedure is permitted as a result of the ACDC barring check, the AS layer (i.e., RRC layer) of the UE 100 transmits an RRC Connect Request message to an eNodeB 200.

As described above, the service requested by the application which is executing in a UE may be differentiated and allowed or barred through the ACDC.

<Machine Type Communication (MTC) Communication>

The Machine Type Communication (MTC) means a communication established between a machine and a machine, in which a person is excluded, and the device used in this case is referred to an MTC device. The service provided through an MTC device is discriminated from the communication service in which a person intervenes, and may be applied to various ranges of services.

Figure 10:
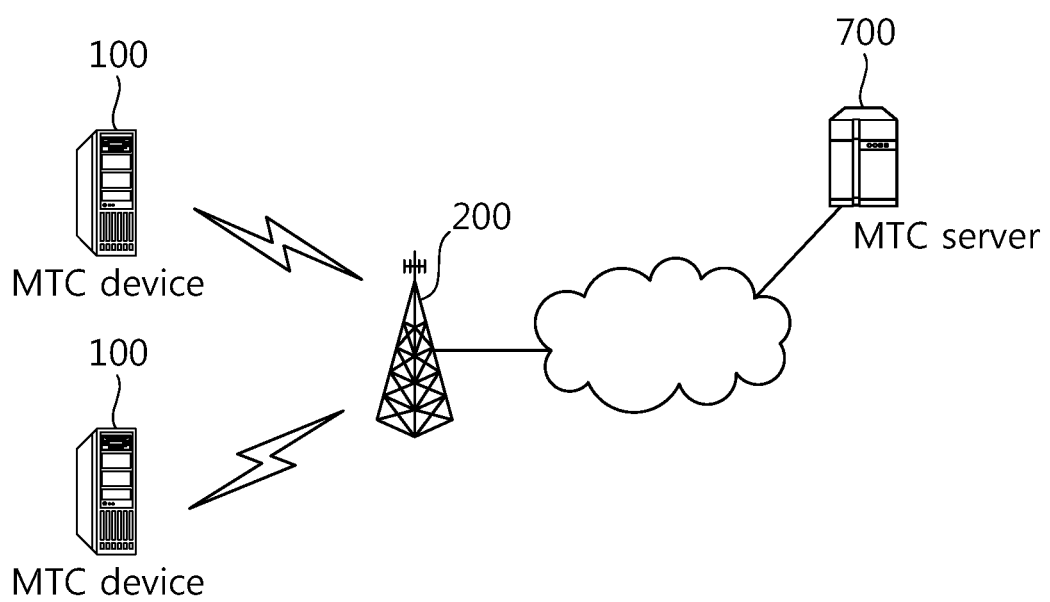
FIG. 10 illustrates an example of the Machine Type communication (MTC) communication.

FIG. 10 illustrates an example of the Machine Type communication (MTC) communication.

The Machine Type Communication (MTC) is referred to information interchange between MTC devices 100 through an eNodeB 200 in which human interaction is not accompanied or information interchange between an MTC device and an MTC server 700 through an eNodeB.

The MTC server 700 is an entity that communicates with an MTC device 100. The MTC server 700 executes an MTC application and provides a MTC-specific service to the MTC device.

The MTC device 100 is a wireless device that provides an MTC communication, and may be fixed or mobile.

However, in coverage of an eNB, a large number of MTC devices may be disposed. Accordingly, this leads to a result that network congestion becomes serious more and more.

Figure 11:
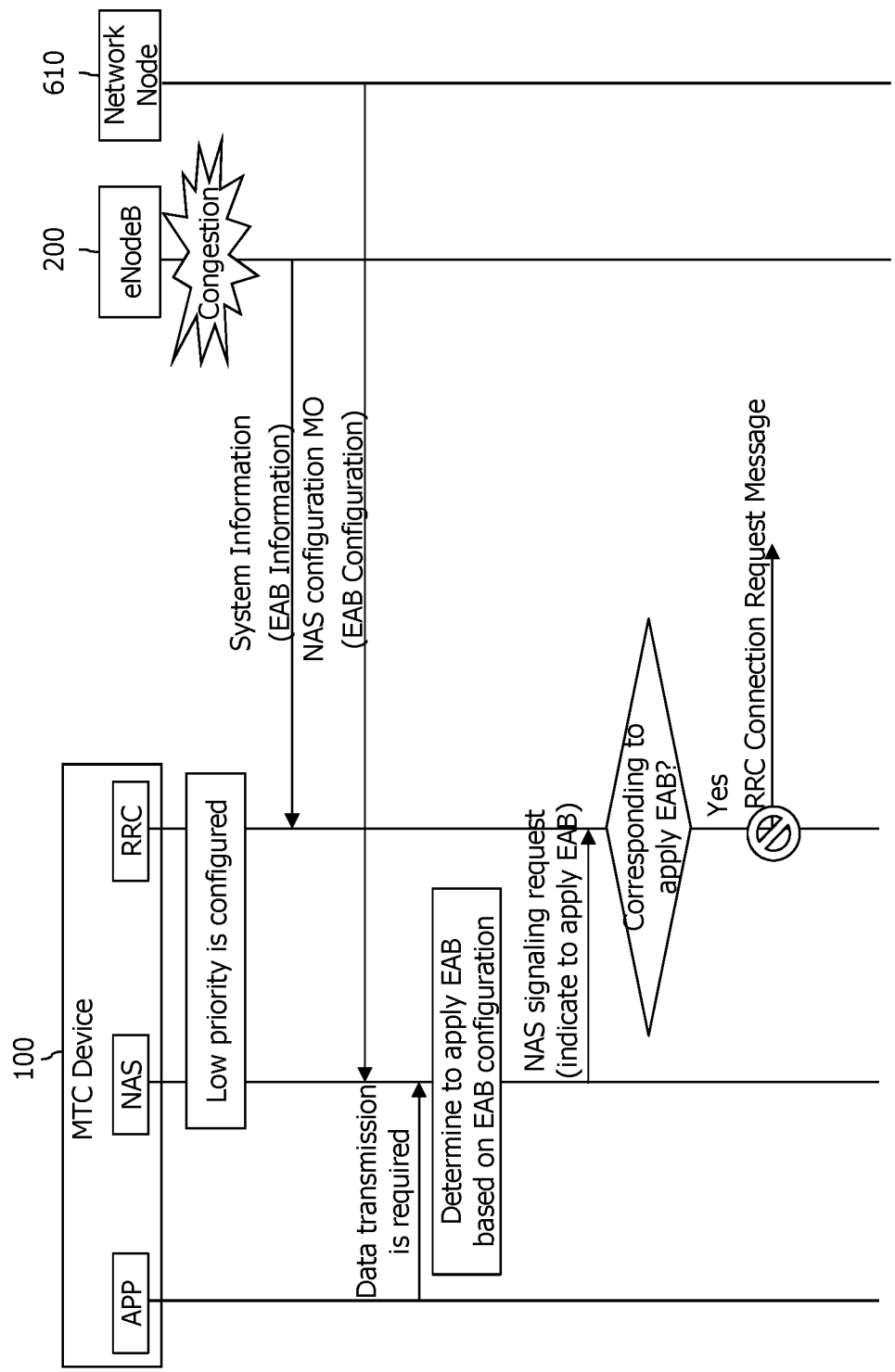
FIG. 11 illustrates an example to which Extended Access Barring (EAB) for solving a congestion caused by an MTC device.

FIG. 11 illustrates an example to which Extended Access Barring (EAB) for solving a congestion caused by an MTC device.

As shown in FIG. 11, an MTC device is configured as low priority. Further, in order to solve the congestion caused by the MTC device, an eNB broadcasts system information that includes EAB information. The system information including the EAB information may be system information block (SIB) type 14.

TABLE 3

SIB Type14 description eab-BarringBitmap
Bitmap of EAB for access class (AC) 0 to 9. In the bitmap, the left most bit is for AC 0, and the second bit is for AC 1.
eab-Category
Indicates the category of UEs for which EAB applies.
eab-Common
The EAB parameters applied for all PLMN.
eab-PerPLMN-List
The EAB parameters per PLMN, listed in the order as the PLMN.

In addition, a network forwards the configuration information on whether a specific MTC device needs to apply EAB, that is, EAB configuration information with being included in NAS configuration Management Object (MO) to the specific MTC device. As such, low priority and EAB are configured, in the MTC device, except for a case corresponding to an Emergency call, a Mobile Terminated (MT) access or a high priority access class (e.g., AC11-15), for the corresponding NAS signaling request procedure (e.g., Attach request procedure, TAU/RAU request procedure, Service request procedure, Extended service request procedure, Data service request procedure, etc.), the NAS layer informs an indication on whether to apply EAB to an RRC layer, and the RRC layer performs an access control by applying EAB when performing an RRC connection establishment procedure with respect to the corresponding request with the EAB application indication.

Accordingly, as shown in FIG. 11, when an application (APP) layer of the MTC device 100 notifies that a data transmission is required, the NAS layer determines to apply EAB based on the EAB configuration. In addition, the NAS layer forwards a NAS signaling request to the RRC layer. At this time, together with the NAS signaling request, the EAB application indication is forwarded together.

The RRC layer of the MTC device determines whether the RRC connection establishment request corresponds to the EAB application based on the EAB application indication. In the case that the EAB is applied, a transmission of an RRC connection establishment request message by the RRC layer is barred (or prohibited).

<Cellular Internet of Things (CIoT) Communication>

MTC communication is also called IoT (Internet of Things) communication because there is no human intervention. Performing IoT communication based on cellular network rather than wireless LAN like Wi-Fi is called CIoT. Unlike wireless LAN, CIoT supports communication which is not based on IP as well as IP-based communication.

Meanwhile, in order to support the CIoT service, the 3GPP has improved the physical layer, that is, RAT (Radio Access Technology). The improved RAT is called NB-IoT (Narrowband-IoT).

The improved RAT for the NB-IoT uses a physical layer which is optimized for very low power consumption (e.g., carrier bandwidth is 180 kHz and subcarrier spacing is 3.75 kHz or 15 kHz).

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

Figure 12:
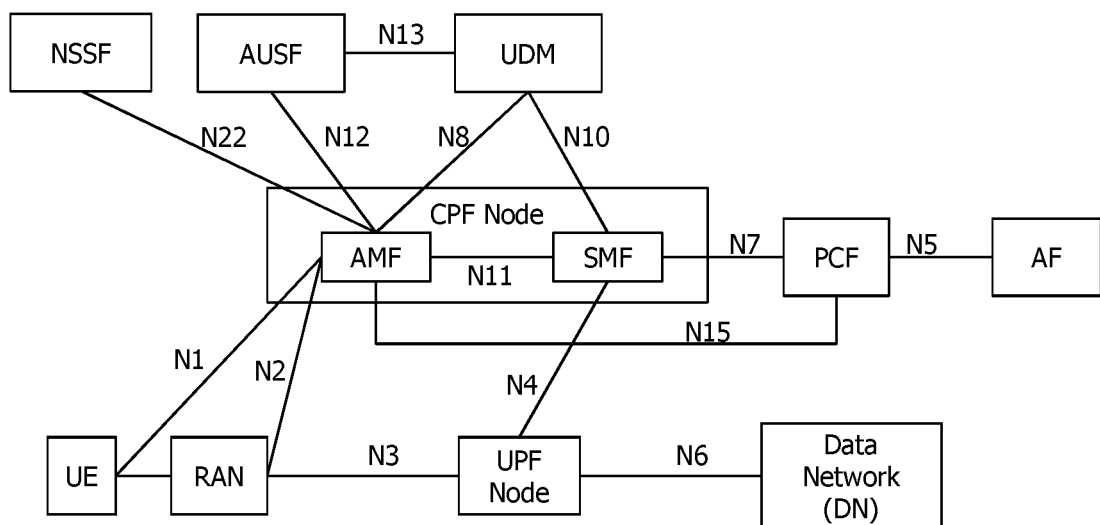
FIG. 12 is a diagram illustrating an expected structure of next generation mobile communication from a node viewpoint.

FIG. 12 is an exemplary diagram illustrating a predicted structure of a next generation mobile communication in terms of a node.

Referring to FIG. 12, the UE is connected to a data network (DN) through a next generation RAN (Radio Access Network).

The Control Plane Function (CPF) node as shown may perform all or a part of the MME (Mobility Management Entity) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the figure is a type of a gateway over which user data is transmitted and received. The UPF node may perform all or part of the user plane functions of the S-GW and the P-GW of the fourth generation mobile communication.

The PCF (Policy Control Function) node as shown is configured to control a policy of the service provider.

The illustrated Application Function (AF) node refers to a server for providing various services to the UE.

The Unified Data Management (UDM) node as shown refers to a type of a server that manages subscriber information, like an HSS (Home Subscriber Server) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

On the other hand, in a situation where the UE roams on a visited network, for example, a V-PLMN, there are two schemes for processing a signaling request from the UE. In the first scheme, that is, LBO (local break out) scheme, the visited network handles the signaling request from the UE. According to the second scheme, that is, Home Routing (HR) scheme, the visited network transmits a signaling request from the UE to the home network of the UE.

Figure 13A:
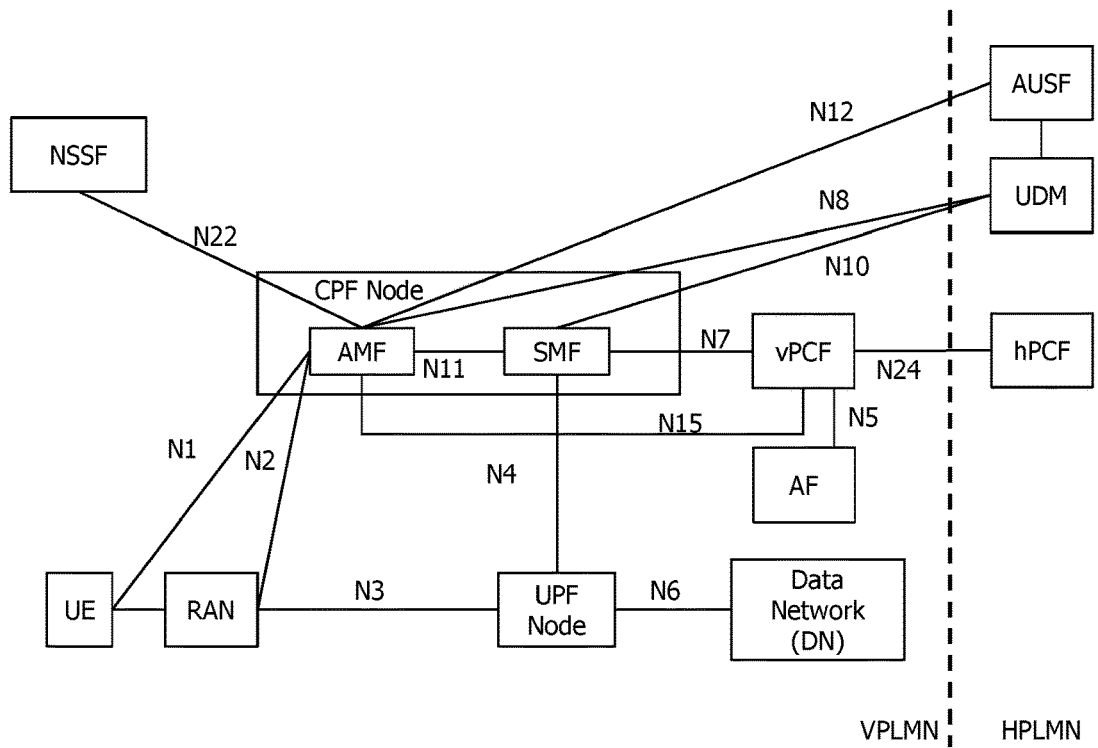
FIG. 13a is a diagram illustrating an architecture to which a local breakout (LBO) method is applied upon roaming.
Figure 13B:
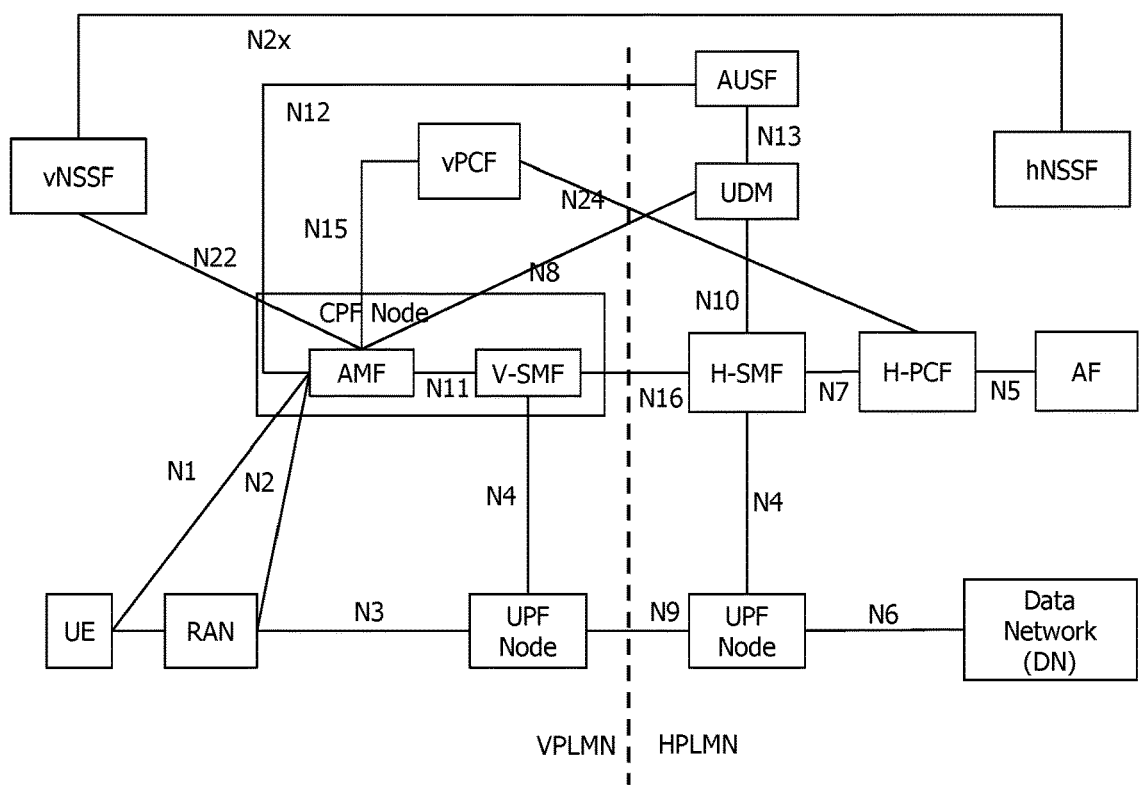
FIG. 13b is a diagram illustrating an architecture to which a home routed (HR) method is applied upon roaming.

FIG. 13A is an exemplary diagram illustrating an architecture to which a local breakout (LBO) scheme is applied when the UE is roaming; FIG. 13B is an exemplary diagram illustrating an architecture to which an HR (home routed) scheme is applied when the UE is roaming.

As shown in FIG. 13A, in the architecture to which the LBO scheme is applied, a PCF node in the VPLMN performs an interaction with an AF node to generate a PCC rule for a service in the VPLMN. The PCF node in the VPLMN creates the PCC rule based on the policy set therein according to the roaming agreement with the HPLMN provider.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other.

Further, the slice instance differs from the dedicated core network in that the network nodes may be logically separated.

Figure 14A:
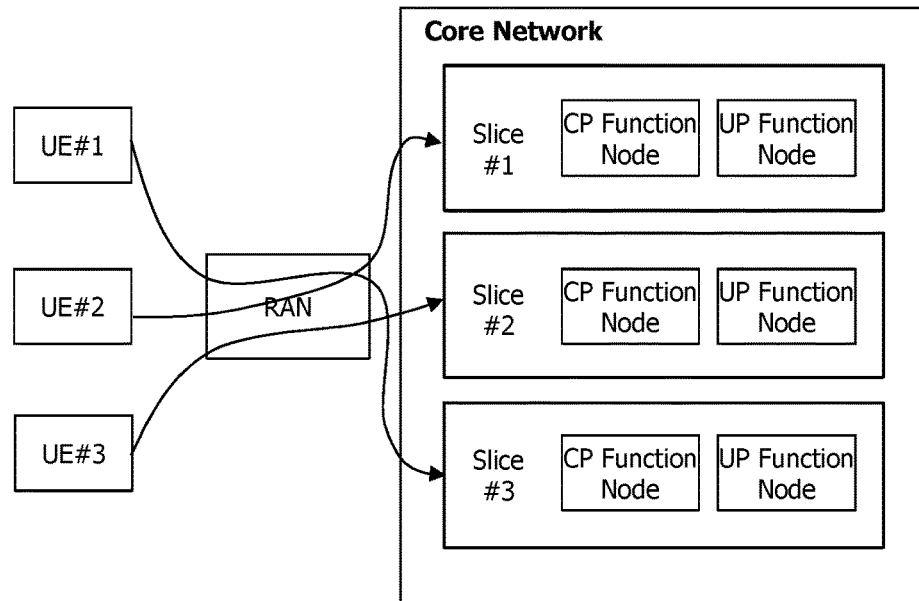
FIG. 14a is a diagram illustrating an example of an architecture for implementing the concept of network slicing.

FIG. 14A is an exemplary diagram illustrating an example of an architecture for implementing the concept of network slicing.

As can be seen from FIG. 14A, the core network (CN) may be divided into several slice instances. Each slice instance may contain one or more of a CP function node and a UP function node.

Each UE may use a network slice instance corresponding to its service through RAN.

Unlike the case shown in FIG. 14A, each slice instance may share one or more of a CP function node, and a UP function node with another slice instance. This will be described with reference to FIG. 14b below.

Figure 14B:
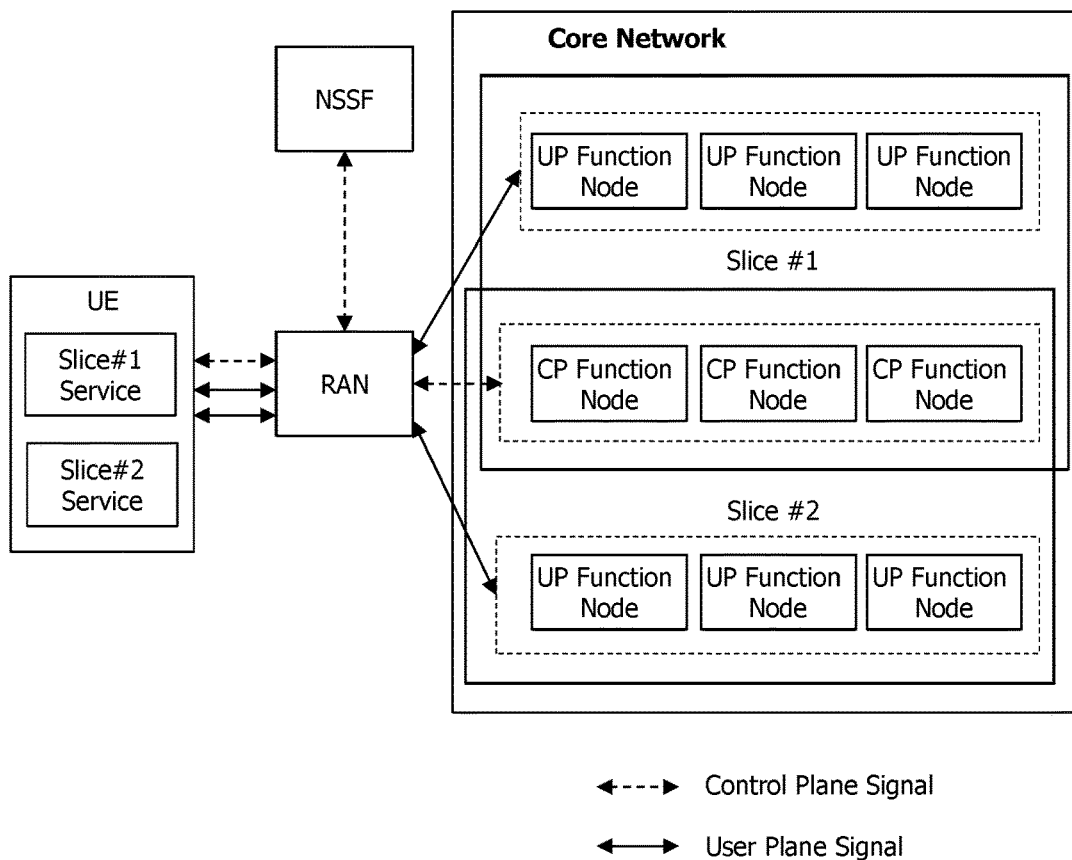
FIG. 14b is a diagram illustrating another example of an architecture for implementing the concept of network slicing.

FIG. 14B is an exemplary view showing another example of an architecture for implementing the concept of network slicing.

Referring to FIG. 14B, a plurality of UP function nodes are clustered, and a plurality of CP function nodes are also clustered.

Further, referring to FIG. 14B, slice instance #1 (or instance #1) in the core network includes a first cluster of an UP function node. Moreover, the slice instance #1 shares the cluster of the CP function node with slice instance #2 (or instance #2). The slice instance #2 includes a second cluster of an UP function node.

The illustrated NSSF selects a slice (or instance) that can accommodate the UE's service.

The illustrated UE may use the service #1 via the slice instance #1 selected by the NSSF and may use the service #2 via the slice instance #2 selected by the NSSF.

<Interworking with Legacy 4th Generation Mobile Communication System>

Even if the UE leaves the coverage of the next generation RAN (Radio Access Network), the UE must be able to receive service via a 4G mobile communication system. This is called interworking. Hereinafter, interworking will be described in detail.

Figure 15A:
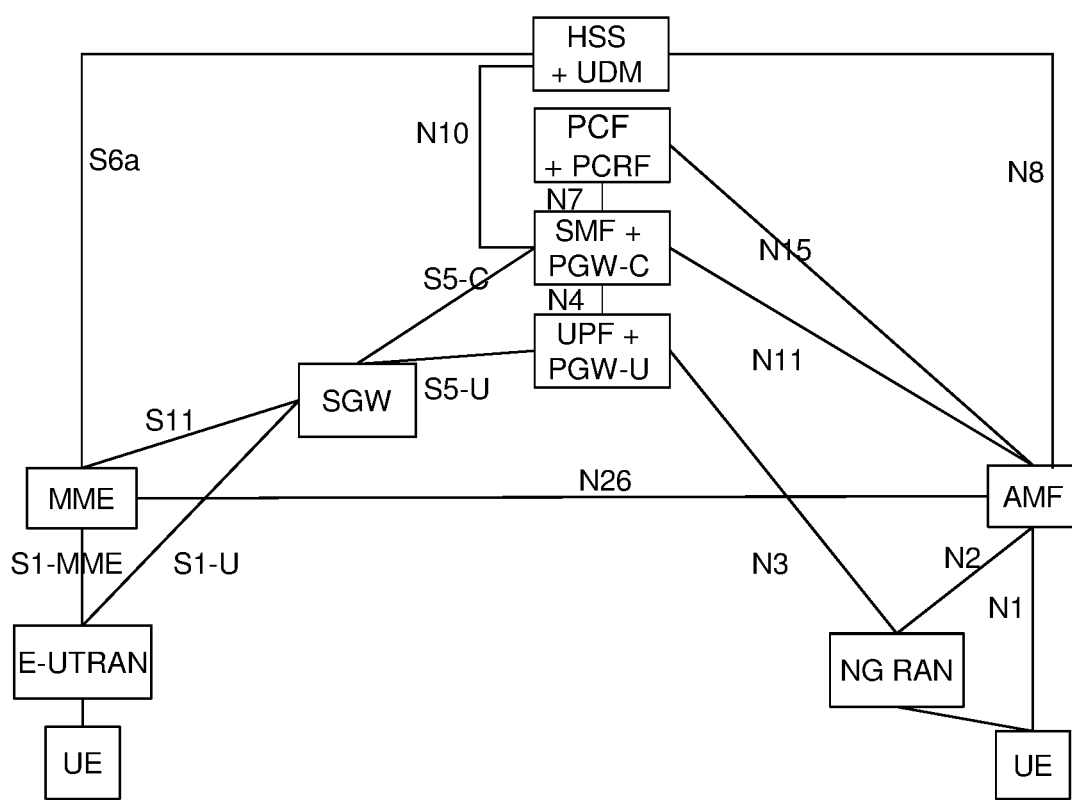
FIG. 15a illustrates an architecture for interworking when a UE does not perform roaming.
Figure 15B:
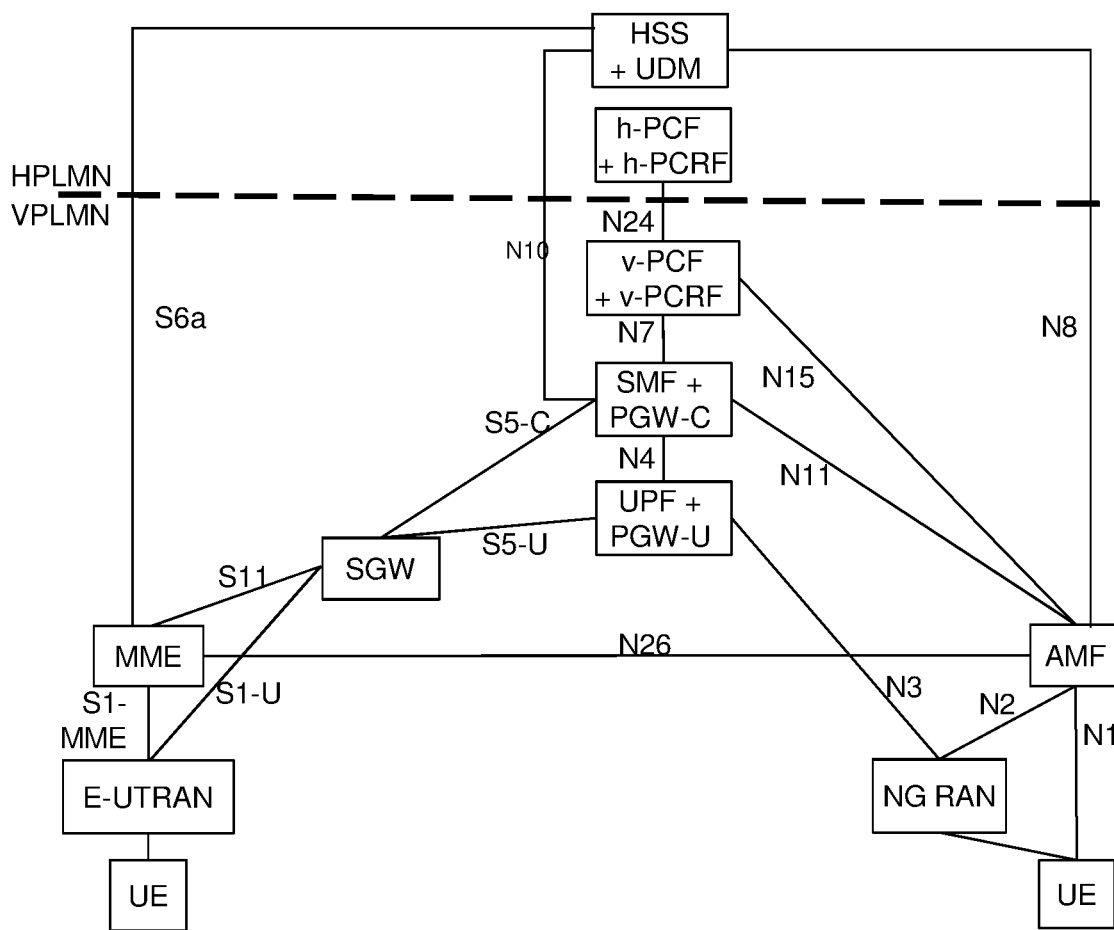
FIG. 15b illustrates an architecture for interworking when a UE performs roaming.

FIG. 15A shows an architecture for interworking when the UE is not roaming, and FIG. 15B shows an architecture for interworking when the UE is roaming.

Referring to FIG. 15A, when the UE does not roam, E-UTRAN and EPC for legacy 4th generation LTE, and 5th generation mobile communication network may be interworked with each other. In FIG. 15A, a packet data network gateway (PGW) for a legacy EPC is divided into a PGW-U, which is responsible for only the user plane, and a PGW-C, which is responsible for the control plane. Moreover, the PGW-U is merged into the UPF node of the fifth-generation core network, and the PGW-C is merged into the SMF node of the fifth-generation core network. Moreover, the Policy and Charging Rules Function (PCRF) for the legacy EPC may be merged into the PCF of the 5th generation core network. Moreover, the HSS for the legacy EPC may be merged into the UDM of the 5th generation core network. The UE may access the core network through the E-UTRAN. Alternatively, the UE may access the core network through the 5G radio access network (RAN) and the AMF.

Referring to FIGS. 15A and 15B while comparing FIGS. 15A and 15B, when the UE roams on a Visited Public Land Mobile Network (VPLMN), the data of the UE is delivered via the Home PLMN (HPLMN).

Meanwhile, the N26 interface shown in FIGS. 15A and 15 refers to an interface connected between the MME and the AMF node to facilitate interworking between the EPC and the NG core. This N26 interface may be selectively supported depending on the network operator. That is, for interworking with the EPC, the network operator may provide the N26 interface or may not provide the N26 interface.

<Disclosure of the Present Specification>

In a conventional 4G mobile communication system, i.e., an LTE system, various access control mechanisms (e.g., ACB, EAB, ACDC, SSAC, etc.) have been developed. When the UE is switched from an RRC idle state to an RRC connected mode for transmission of data or signaling, the conventional access control mechanism is performed. However, when a plurality of access control mechanisms operates, there is no effective mutual processing method. Further, when the UE is in an RRC connected mode, an existing access control mechanism is not applied and thus there is a problem that access control cannot be efficiently performed. In particular, when the UE is in an RRC connected mode, there is a problem that access control for signaling for session management cannot be performed.

As described above, an architecture for a next generation (i.e., NextGen) (so-called 5G) mobile communication system (also referred to as so-called LTE-A Pro) has recently been discussed. However, existing access control mechanisms have an inefficient problem and thus it is not appropriate to apply the existing access control mechanisms to a next generation mobile communication system.

Accordingly, the disclosure of the present specification provides proposals for solving the above-mentioned problems.

I. First Disclosure

In the first disclosure, a next generation (i.e., NextGen) (so-called 5G) mobile communication system (also referred to as so-called LTE-A Pro) provides an efficient access control scheme of a UE. When briefly summarizing the first disclosure, a NAS layer of the UE may optionally transfer an access category or a call type and/or an RRC establishment cause to an AS layer. A detailed description thereof is as follows.

Figure 16:
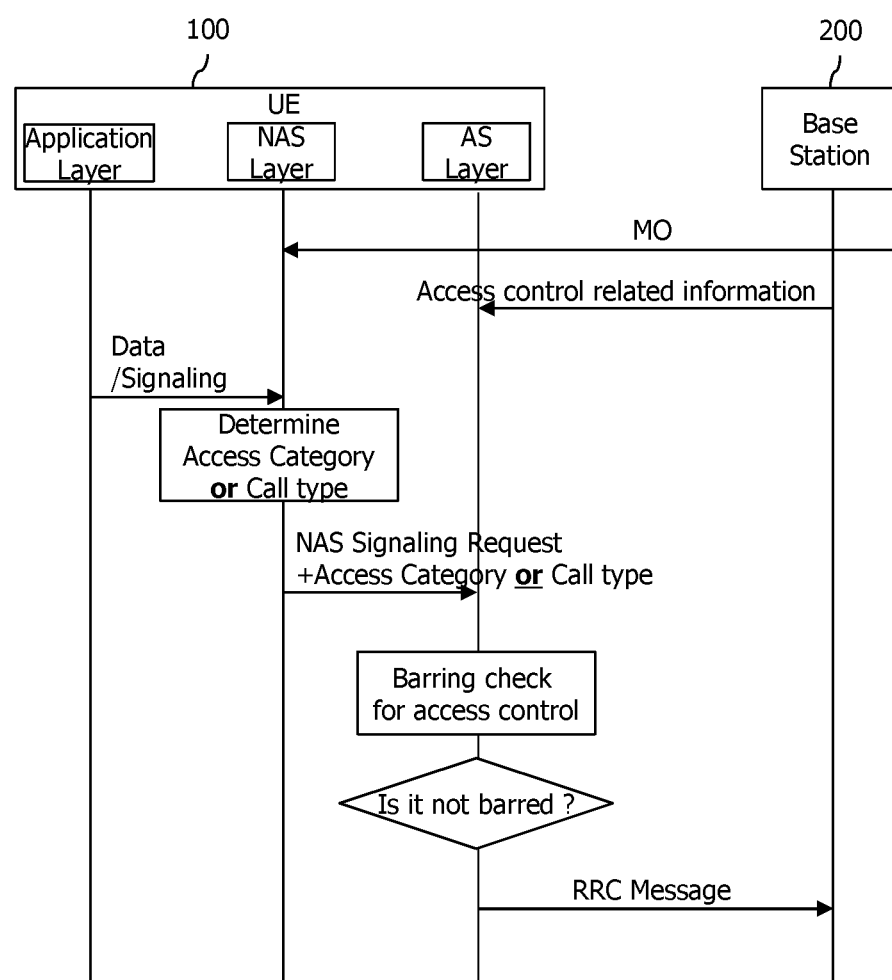
FIG. 16 is a signal flow diagram illustrating an exemplary procedure according to a first disclosure of the present invention.

FIG. 16 is a signal flow diagram illustrating an exemplary procedure according to a first disclosure of the present specification.

In order to perform access control, the network may transfer access category mapping information in a Management Object (MO) form based on Open Mobile Alliance (OMA) Device Management (DM) to the UE. The access category mapping information may be set based on a Mobility Management (MM) procedure of the NAS layer, a Session Management (SM) procedure of the NAS layer, an RRC procedure, an application, an access class, delay sensitivity (or delay tolerant), a type of the UE, and a service type.

When the AS layer (i.e., RRC layer) of the UE receives access control related information/parameter (e.g., barring ratio, setup information on whether barring is applied (ON/OFF)) from the base station/network, the AS layer transfers the information to the application layer (or IMS layer) of the UE. In this case, the AS layer (i.e., RRC layer) may transfer the access control related information/parameter to the application layer (or IMS layer) through the NAS layer.

The NAS layer may determine each access category for performing access control for each MM procedure thereof, SM procedure thereof, RRC procedure, application, access class, delay sensitivity, type of the UE, or service type. Here, the MM procedure of the NAS layer may include an Attach procedure (i.e., transmission of a attach request message), a registration procedure (i.e., transmission of a registration request message), a Tracking Area Update (TAU) procedure (i.e., transmission of a TAU request message), a registration update procedure (i.e., transmission of a registration update request message), a service request procedure (i.e., transmission of a service request message or transmission of a control plane service request message, transmission of an extended service request message), a connection request procedure (i.e., transmission of a connection request message), and a detach procedure. The SM procedure of the NAS layer may include a PDU session procedure (i.e., transmission of a PDU session request message), a PDU session modification procedure (i.e., transmission of a Modify PDU Session Request message), a PDU session deactivation procedure (i.e., transmission of a Deactivate PDU Session Request message), a PDU session disconnection procedure (i.e., transmission of a PDU session disconnect request message), a PDN connection request procedure (i.e., transmission of a PDN connectivity request message), a PDN disconnection procedure (i.e., transmission of a PDN disconnection request message), a bearer resource allocation request procedure (i.e., transmission of a bearer resource allocation request message), and a bearer resource modification request procedure (i.e., transmission of a bearer resource modification request message). The RRC procedure may include an RRC connection request procedure, an RRC connection resumption procedure, an RRC connection reestablishment request procedure, an RRC inactive request procedure, and an RRC active request procedure.

Table 4 shows an exemplary access category for each procedure.

TABLE 4

| Procedure | Category |
| --- | --- |
| Attach/registration request procedure | Category 1 |
| TAU/registration update procedure | Category 2 |
| Service request procedure | Category 3 |
| PDU session request procedure | Category 4 |
| PDU session modification procedure | Category 5 |
| PDU session disconnection procedure | Category 6 |
| PDN connection request procedure | Category 7 |
| PDU session deactivation procedure | Category 8 |
| RRC connection request procedure | Category 9 |
| RRC connection resumption request procedure | Category 10 |
| Response to Mobile Terminated (MT) service | Category 11 |
| Emergency service | Category #99 |

In Table 4, the higher the number of access category, the higher a priority and the lower a barring rate. That is, a procedure having a high number of access category may have a high probability to pass through a barring check for access control and thus high connectivity is guaranteed. In contrast, the higher the number of access category, the lower a priority and the higher the barring rate. That is, a procedure having a high number of access category may have a lower probability to pass through a barring check for access control and thus low connectivity is guaranteed. Further, for an access category of a particular number, a barring check may be especially skipped or barred to be differentiated. For example, as the access category #99 is set to an emergency service, a barring check of the emergency service may be skipped to be connected.

Alternatively, the NAS layer may determine each of an MM procedure thereof, an SM procedure thereof, an RRC procedure, and a call type and/or an RRC establishment cause for performing access control for each application.

Table 5 shows an exemplary call type and/or RRC establishment cause of each procedure.

TABLE 5

| Procedure | Call type and/or RRC establishment cause |
| --- | --- |
| Attach/registration request procedure | Call type = (mobile) originating attach and/or RRC establishment cause = mo-attach |
| TAU/Registration update procedure | Call type = (mobile) originating TAU and/or RRC establishment cause = mo-TAU |
| Service request procedure | Call type = (mobile) originating service and/or RRC establishment cause = mo-service |
| PDU session request procedure | Call type = (mobile) originating PDU session and/or RRC establishment cause = mo-pdusession |
| PDU session modification procedure | Call type = (mobile) originating modify PDU session and/or RRC establishment cause = mo-modifypdusession |

TABLE 5-continued

| Procedure | Call type and/or RRC establishment cause |
|---|---|
| PDU session disconnection procedure | Call type = (mobile) originating PDU session disconnect and/or RRC establishment cause = mo-pdusessiondisconnect |
| PDN connection request procedure | Call type = (mobile) originating PDN connectivity and/or RRC establishment cause = mo-PDNconnectivity |
| PDU session deactivation procedure | Call type = (mobile) originating deactivate PDU session and/or RRC establishment Cause = mo-deactivatePDUsession |
| RRC connection request procedure | Call type = (mobile) originating RRCconnection and/or RRC establishment cause = mo-RRCconnection |
| RRC connection resumption request procedure | Call type = (mobile) originating RRCconnectionresume and/or RRC establishment cause = mo-RRCconnectionresume, etc. |

The AS layer (i.e., RRC layer) of the UE may set a call type and/or an RRC establishment cause of the RRC procedure. Alternatively, after the base station sets a call type and/or an RRC establishment cause, the base station may provide the call type and/or the RRC establishment cause to the AS layer (i.e., RRC layer) of the UE. The NAS layer of the UE may set an MM procedure thereof, an SM procedure thereof, and a call type and/or an RRC establishment cause for each application. Alternatively, after the base station sets a call type and/or an RRC establishment cause, when the base station provides the MM procedure of the NAS layer, the SM procedure of the NAS layer, and the call type and/or the RRC establishment cause to the AS layer of the UE, the AS layer of the UE may transfer the MM procedure of the NAS layer, the SM procedure of the NAS layer, and the call type and/or the RRC establishment cause to the NAS layer.

The network node (e.g., base station) may provide barring information (including information indicating skipping of the barring check) for access control for the each access category or call type and/or RRC establishment cause to the AS layer (i.e., RRC layer) of the UE through a Master Information Block (MIB) and a System Information Block (SIB). The SIB information may be defined and included in SIB2 or SIB14 or a new SIB (xx).

Further, when the application layer (or including the IMS layer) requests a call for a Mobile Originating (MO) service to the NAS layer or requests data transmission to the NAS layer, the NAS layer may divide and set call types and RRC establishment causes of Table 6 for the MO service.

TABLE 6

| Division | Call type and/or RRC establishment cause |
|---|---|
| (general, normal) call or data | Call type: (Mobile) originating calls, "originating MMTEL voice for MMTEL voice", "originating MMTEL video for MMTEL video", "originating SMSoIP for SMS over IP", "originating SMS for SMSRRC establishment cause: set to MO data or access category 12 |
| MT service | Call type: (Mobile) terminating callsRRC establishment cause: set to MT access or access category 11 |
| (emergency data, exception data) call or data or signaling | Call type: (Mobile) originating exception (or MO exception calls, etc.) or (Mobile) originating calls or (Mobile) originating signalling RRC establishment cause: set to MO exception (or MO exception data, MO exception signalling, etc.) or access category 13 |
| Low delay sensitive (or delay tolerant) UE | Call type: (Mobile) originating calls, "originating MMTEL voice for MMTEL voice", "originating MMTEL video for MMTEL video", "originating SMSoIP for SMS over IP", "originating SMS for SMSRRC establishment cause: set to DelayTolerant or access category 14 |
| EAB | Call type: (Mobile) originating calls, "originating MMTEL voice for MMTEL voice", "originating MMTEL video for MMTEL video", "originating SMSoIP for SMS over IP", "originating SMS for SMSRRC establishment cause: set to EAB or access category 15 |
| Access class 3: | Call type: (Mobile) originating calls, "originating MMTEL voice for MMTEL voice", "originating MMTEL video for MMTEL video", "originating SMSoIP for SMS over IP", "originating SMS for SMSRRC establishment cause: set to MO data or access category 16 |
| Access class 10 | Call type: emergency callRRC establishment cause: set to emergency or access category 17 |

In this case, the application layer of the UE may provide information/indication that distinguishes delay data and exception data to the NAS layer.

When starting an NAS signaling request (i.e., MM procedure and/or SM procedure) for data transmission, the NAS layer of the UE may set each of an access category or a call type and/or an RRC establishment cause, as described above to provide the access category or the call type and/or the RRC establishment cause to the AS layer (i.e., RRC layer).

When starting an NAS signaling request (MM procedure and/or SM procedure) for data transmission, a plurality of access categories may be (simultaneously) determined. In this case, the NAS layer may provide only a high (e.g., highest) access category or a lower (e.g., lowest) access category of the plurality of access categories to the AS layer (i.e., RRC layer). Alternatively, the NAS layer may provide all of the plurality of access categories to the AS layer (i.e., RRC layer). Alternatively, the NAS layer may select only one access category of the plurality of access categories based on at least one of an NAS setup Management Object (MO), a new MO, setup of the UE, and an operator policy and provide the one access category to the AS layer.

The AS layer performs a barring check for access control based on the received information (i.e., access category mapping information or a call type and/or an RRC establishment cause) and access control related information/parameter received from the network through a Master Information Block (MIB) or a System Information Block (SIB). In this case, the barring check may differentiate an NAS signaling connection request based on a probability. Alternatively, the barring check may differentiate by determining whether to bar access based on a bitmap. In this case, an access category in which the NAS layer provides to the AS layer may be a high (i.e., highest) access category or a low (i.e., lowest) access category selected by the NAS layer. When the NAS layer provides all of a plurality of access categories to the AS layer, the AS layer may select a high (or highest) access category or a low (i.e., lowest) access category of the plurality of access categories. Thereafter, the AS layer performs access control based on the selected access category, a call type and/or an RRC establishment cause received from the NAS layer, and access control information/parameter received through the MIB or the SIB from the network. Alternatively, the AS layer may select one of a plurality of access categories based on a NAS setup Management Object (MO), a new MO, setup of the UE, an operator policy, and MIB/SIB information and perform access control based on the selected access category, the call type and/or the RRC establishment cause received from the NAS layer, and access control information/parameter received from the network through the MIB/SIB.

When a plurality of access categories is (simultaneously) determined, a particular access category (e.g., a common/general access category or a specific access category) of the plurality of access categories may be selected, and operations of the NAS layer and the AS layer may be performed based on the particular access category.

Alternatively, when a plurality of access categories is (simultaneously) determined, the NAS layer and the AS layer each may perform an operation for access control of each access category. In this way, when the AS layer performs an operation for access control of each access category, the AS layer may provide information (i.e., success or failure) on a result of a barring check for access control of each access category to the NAS layer. When success information is received, the NAS layer may perform an operation for additional access control of each access category. When failure information is received, the NAS layer may stop an entire operation for access control of each access category or stop only an operation for access control of the corresponding access category and perform an operation for access control of other access categories.

In this case, when the NAS layer receives information on success or failure of access control of each access category from the AS layer, the NAS layer may store the information on success or failure for each access category.

When barring (i.e., failure) is determined as a result of a barring check for access control of the particular access category, an NAS signaling request for the same access category may not be started (until receiving information representing barring alleviation of the corresponding access category from the AS layer). When passing (i.e., success) is determined as a result of a barring check for access control of the particular access category, an NAS signaling request for the same access category may be started. Further, the AS layer (i.e., RRC layer) may also store information (i.e., information on success and failure) about the result of the barring check for access control of each access category. In a case of barring (i.e., failure), the AS layer may drive a barring timer for each access category. When a barring timer for each access category has expired, the AS layer may provide information representing that barring of each access category is alleviated to the NAS layer.

Further, when the NAS layer provides all of a plurality of access categories or any one of a plurality of access categories to the AS layer, the NAS layer may additionally provide transaction ID of each access category. The AS layer (i.e., RRC layer) may also store information (i.e., success or failure) on a result of a barring check for access control of each access category. In this case, the AS layer may together store the transaction ID. In the case of barring (i.e., failure), a barring timer for each access category may operate in conjunction with a transaction ID. When the barring timer for each access category has expired, the AS layer may provide information representing that barring of each access category is alleviated and transaction ID to the NAS layer.

In a situation in which the plurality of access categories are determined, even when a plurality of call types and/or a plurality of RRC establishment causes are determined, the above-described description on an operation of the NAS layer and the AS layer of the UE may be equally applied.

Further, when transmitting an RRC connection establishment request message for transmitting the NAS signaling request, the AS layer of the UE may provide access category or call type and/or an RRC establishment cause information to the network node (e.g., base station).

Therefore, according to the access control improved by the first disclosure, the UE may perform an access control mechanism regardless of whether the UE is in an RRC idle state, an RRC connected mode, or an RRC inactive mode.

In the RRC idle state, an MM procedure of the NAS layer is generally performed. Therefore, for a mobile originating (MO) service (e.g., MO data or MO calls) in the RRC idle state, the access control mechanism improved according to the first disclosure is performed. However, in the RRC connected mode (or RRC inactive mode), an SM procedure of the NAS layer is generally performed. In this case, the access control mechanism improved according to the first disclosure is performed.

According to a conventional LTE system, in order for the NAS layer of the UE to perform an MM procedure in an RRC idle state, when the NAS layer transfers a call type and/or an RRC establishment cause to the AS layer while transferring an NAS signaling request message (e.g., attach request message, TAU request message, service request message, CP service request message, extended service request message, or connection request message) to the AS layer, the AS layer performs a barring check for access control based on call type and/or RRC establishment cause information.

However, according to the first disclosure, in order for the NAS layer of the UE to perform an MM procedure in the RRC idle state, the NAS layer provides access category or call type and/or RRC establishment cause information together with an NAS signaling request message to the AS layer of the UE. Therefore, the AS layer of the UE performs a barring check for access control based on the access category or call type and/or RRC establishment cause information.

According to the first disclosure, in order for the NAS layer of the UE to perform the SM procedure in an RRC connected mode (or RRC inactive mode), the NAS layer transfers access category or call type and/or RRC establishment cause information together with an NAS signaling request message (e.g., PDU session request message, PDU session modification request message, PDU session disconnection request message, PDN connection request message, PDU session inactive request message, and ESM NAS layer message) to the AS layer of the UE. Therefore, the AS layer of the UE performs a barring check for access control based on the access category or call type and/or RRC establishment cause information.

Further, according to the first disclosure, when the UE in the RRC inactive state or the RRC active state performs an RRC procedure, the UE may perform a barring check for access control based on the access category or call type and/or RRC establishment cause information.

According to the first disclosure, when the UE is in an RRC connected mode (or RRC inactive mode), after the NAS layer of the UE performs the barring check for access control based on the access category or call type and/or RRC establishment cause information for an NAS signaling request message for performing an SM procedure, if the barring check is passed, the NAS layer includes the NAS signaling request message in the RRC message and transmits the RRC message to the network. The RRC message may be any one of an RRC connection setup complete message, an RRC connection resume complete message, an RRC connection reestablishment complete message, an RRC connection reconfiguration complete message, an RRC active request or complete message, an RRC inactive request or complete message, a UE capability information message, a UL information transfer message, or a new RRC message for an RRC connected mode.

II. Second Disclosure

The second disclosure proposes an efficient access control scheme of a UE in a next generation (i.e., NextGen) (so-called 5G) mobile communication system (also referred to as so-called LTE-A Pro). The difference of the second disclosure from the first disclosure is as follows. According to the first disclosure, the NAS layer of the UE selectively transfers an access category or a call type and/or an RRC establishment cause to the AS layer. According to the second disclosure, the NAS layer of the UE may transfer a call type and/or an RRC establishment cause together with an access category to the AS layer.

A detailed description thereof is as follows.

Figure 17:
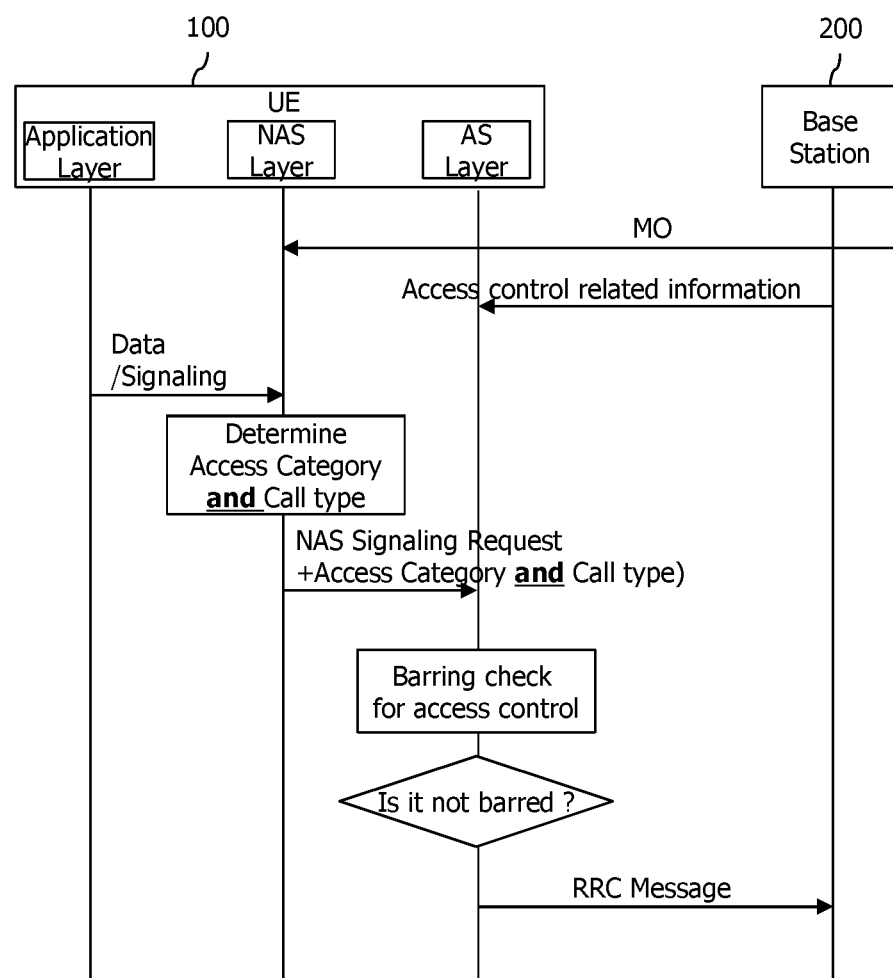
FIG. 17 is a signal flow diagram illustrating an exemplary procedure according to a second disclosure of the present invention.

FIG. 17 is a signal flow diagram illustrating an exemplary procedure according to a second disclosure of the present specification.

In order to perform access control of the UE, the network determines an access category based on an MM procedure of the NAS layer, an SM procedure of the NAS layer, an RRC procedure, an application, an access class, delay sensitivity, a type of a UE, and a service type. The network may provide the access category to the UE through a Management Object (MO) based on OMA DM.

Here, the MM procedure and the SM procedure of the NAS layer are the same as those described in the first disclosure. The RRC procedure is the same as that described in the first disclosure.

That is, each access category for access control may be set for each MM procedure of the NAS layer, SM procedure of the NAS layer, RRC procedure, application, access class, delay sensitivity, type of the UE, or service type.

An illustrative access category for each procedure is shown in Table 4.

Alternatively, each call type and/or RRC establishment cause for access control may be set for each MM procedure of the NAS layer, SM procedure of the NAS layer, RRC procedure, and application.

An exemplary call type and/or RRC establishment cause of each procedure are(is) shown in Table 5.

Further, when the application layer (or including the IMS layer) requests a call for a Mobile Originating (MO) service to the NAS layer or when the application layer (or including the IMS layer) requests data transmission to the NAS layer, the NAS layer may classify and set a call type and an RRC establishment cause of Table 6 for the MO service.

The AS layer performs a barring check for access control based on the information (i.e., access category mapping information and a call type and/or an RRC establishment cause) received from the application layer (or including the IMS layer) or the NAS layer and access control information/parameter received from the network through a Master Information Block (MIB) or a System information block (SIB).

In addition, the description of the second disclosure is the same as the description of the above-described first disclosure and therefore a detailed description thereof may be omitted and the description of the first disclosure will be used.

III. Third Disclosure: Overload Control

In the third disclosure, it is assumed that an NAS layer of the UE may access to both a next generation core network (so-called NG core) and an Evolved Packet Core (EPC) of 4G This may mean that the NAS layer of the UE supports a dual protocol stack. Alternatively, the NAS layer of the UE may use a single integrated protocol stack.

In general, when radio access technology (RAT) of the base station accessed to the UE is 5G NR, the UE may be connected to a next generation core network (so-called NG core) through the base station. However, in the third disclosure, even if RAT of the base station accessed to the UE is 4G LTE (or referred to as E-UTRA), it is considered that the UE may be connected to the next generation core network (so-called NG core) through the base station.

Figure 18:
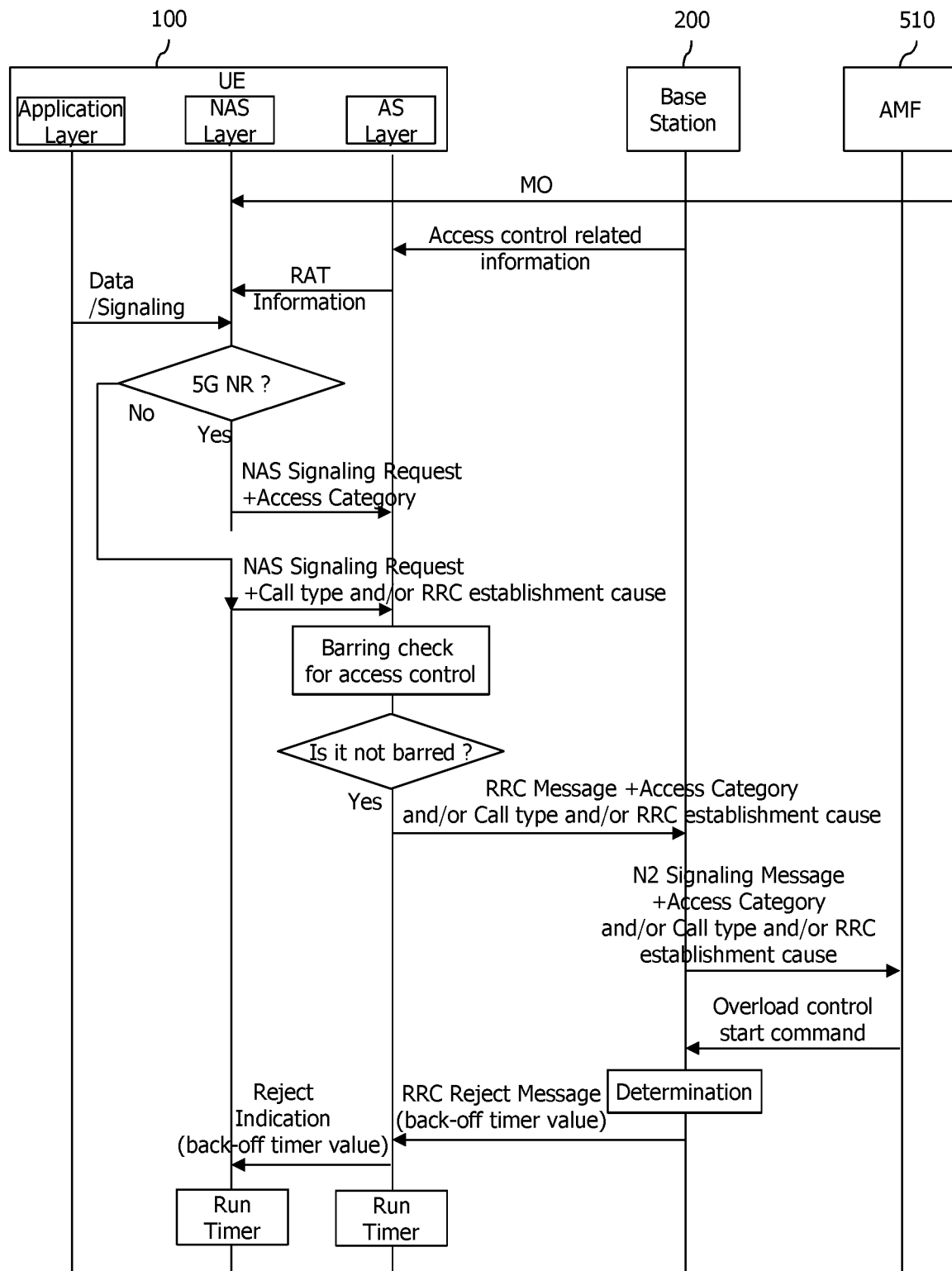
FIG. 18 is a signal flow diagram illustrating an exemplary procedure according to a third disclosure of the present invention.

FIG. 18 is a signal flow diagram illustrating an exemplary procedure according to the third disclosure of the present specification.

In the above-described situation, according to the third disclosure, the AS layer of the UE provides RAT information of a currently accessed/connected base station to the NAS layer of the UE. The NAS layer of the UE recognizes RAT of the currently accessed/connected base station by the RAT information received from the AS layer (i.e., RRC layer).

In this case, when the NAS layer of the UE requests NAS signaling connection, the AS layer (i.e., RRC layer) of the UE performs a barring check for access control before establishing RRC connection for the NAS signaling connection request. In this case, the NAS layer of the UE provides necessary information when the AS layer (i.e., RRC layer) performs a barring check. Specifically, the NAS layer of the UE determines necessary information when the AS layer performs a barring check based on the currently accessed/connected RAT information received from the AS layer. For example, when RAT currently accessed to the UE is 4G LTE (i.e. E-UTRA), the NAS layer of the UE may provide information such as a call type and/or an RRC establishment cause, EAB indication, overriding EAB indication, and ACDC access category that may be used for the 4G E-UTRAN to the AS layer (i.e., RRC layer) of the UE. Alternatively, when RAT currently accessed to the UE is 5G NR, the NAS layer of the UE may provide information such as access category for a 5G NG core to the AS layer (i.e., RRC layer) of the UE. Alternatively, when RAT currently accessed to the UE is 5G NR, the NAS layer of the UE may provide call type and/or RRC establishment cause information that may be used for the 4G E-UTRAN together with the access category to the AS layer (i.e., RRC layer) of the UE. Alternatively, although RAT currently accessed to the UE is 4G LTE (i.e. E-UTRA), when the NAS layer of the UE provides an access category to the AS layer, the AS layer (i.e., RRC layer) of the UE may set an appropriate RRC establishment cause based on the access category.

Although the NAS layer of the UE provides call type and/or RRC establishment cause information to the AS layer (i.e., RRC layer) of the UE together with the access category or although the NAS layer of the UE provides only an access category, when the AS layer determines call type and/or RRC establishment cause information based on the access category, the AS layer of the UE performs a barring check for access control according to the first disclosure or the second disclosure.

When passing is determined instead of barring as a result of the barring check, the AS layer transmits an RRC procedure message (e.g., RRC connection request message).

Therefore, the base station transmits an N2 signaling message to the AMF using an N2 interface of FIG. 12. In this case, for overload control, the base station includes an RRC establishment cause in the N2 signaling message and transfers the N2 signaling message to the AMF.

Therefore, when the AMF performs overload control, the AMF refers to the RRC establishment cause value. Here, the overload control means that the AMF sends an overload start command to the base station based on the RRC establishment cause value in a congestion/overload situation of the network. When the base station receives the overload start command, the base station may reject or accept an RRC connection request of the UE based on the RRC establishment cause value. When the RRC connection request is rejected, the base station may include an (extended) wait time value in the rejection message and transmit the rejection message to the UE.

Therefore, the AS layer (i.e., RRC layer) of the UE transfers the (extended) wait time value to the NAS layer of the UE together with an indication representing rejection of the NAS signaling request.

The NAS layer of the UE drives a timer according to the (extended) wait time value (when the back-off timer previously received from the network does not operate). The NAS layer of the UE does not additionally perform an NAS signaling request until the timer has expired. Similarly, the AS layer (i.e., RRC layer) of the UE does not perform an RRC connection request until the timer according to the (extended) wait time value has expired.

When a congestion/overload situation of the core network is solved, the AMF sends an overload stop command to the base station. Therefore, the base station no longer performs overload control for an RRC connection request of the UE. That is, the base station may accept an RRC request including a specific RRC establishment cause value.

When the NAS layer of the UE provides only an access category to the AS layer (i.e., RRC layer) of the UE, the AS layer of the UE performs a barring check for access control, as described in the first disclosure or the second disclosure based on the access category provided in the NAS layer. Thereafter, when a barring check for access control is passed, the AS layer of the UE transmits an RRC message. Therefore, the base station transmits an N2 signaling message using the N2 interface to the AMF. In this case, the base station includes the access category in the N2 signaling message and transfers the N2 signaling message. Therefore, the AMF performs overload control based on the access category. A detailed description about the overload control adapts the foregoing description.

For the above-described overload control, the AMF should recognize/grasp information on the access category. That is, information on the access category may be preset in advance by an operator policy or the like. Alternatively, information on the access category may be preset through a policy function node (e.g., PCF) or Unified Data Management (UDM).

When the NAS layer of the UE provides only an access category to the AS layer (i.e., RRC layer) of the UE, the AS layer of the UE performs a barring check for access control based on the category information. Further, the AS layer of the UE may set an RRC establishment cause based on the access category. In this case, the AS layer of the UE may obtain access category related information through an AT-command. When passing is determined instead of barring as a result of a barring check for the access control, the RRC connection procedure is performed. Thereafter, the base station transmits an N2 signaling message using an N2 interface to the AMF. In this case, the base station includes and transfers an RRC establishment cause in the N2 signaling message. Therefore, the AMF performs overload control based on the RRC establishment cause. A detailed description about the overload control adapts the foregoing description.

The description described in the third disclosure may be applied to an RRC connection release procedure as well as an RRC connection request procedure.

IV. Fourth Disclosure

The fourth disclosure describes an operation of performing a barring check for access control when the UE is in an RRC connected mode (or RRC inactive mode). When the UE is in an MM connected mode, an RRC connected mode, or an RRC inactive mode, the description described in the first disclosure to the third disclosure may be improved as follows.

IV-1. First Scheme

Figure 19:
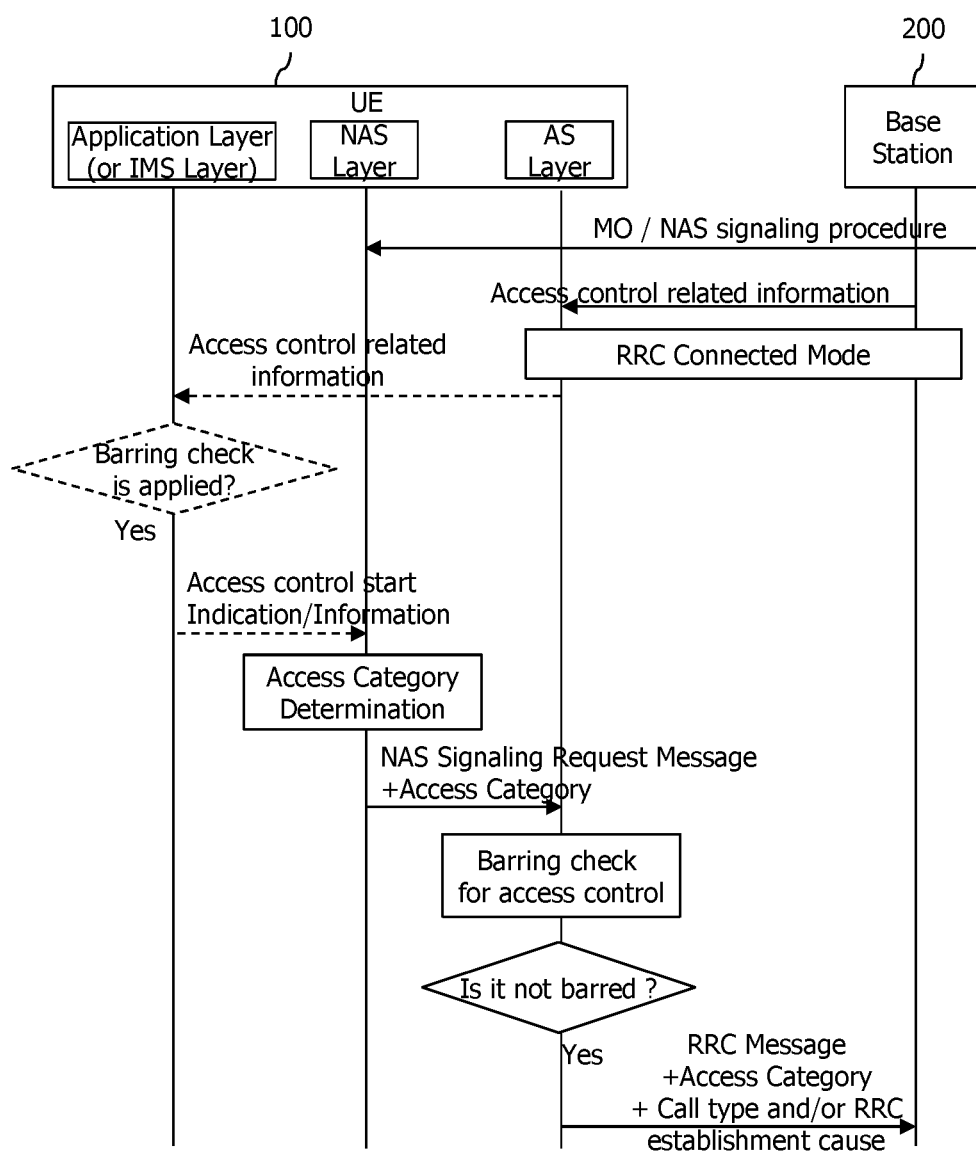
FIG. 19 is a signal flow diagram illustrating an exemplary procedure according to a first scheme of a fourth disclosure.

FIG. 19 is a signal flow diagram illustrating an exemplary procedure according to a first scheme of a fourth disclosure.

When the AS layer (i.e., RRC layer) of the UE receives access control related information/parameter (e.g., barring ratio, setup information on whether barring is applied (ON/OFF)) from the base station/network, the AS layer may transfer the information to the application layer (or IMS layer) of the UE. In this case, the AS layer (i.e., RRC layer)

may transfer access control related information/parameter to the application layer (or IMS layer) through the NAS layer.

When MO data or MO signaling occurs and when the access control related information/parameter is received from the AS layer (i.e., RRC layer)/NAS layer, the application layer (or IMS layer) checks whether a barring check for access control is applied. When application of the barring check is required, the application layer (or IMS layer) may provide access control start indication/information to the NAS layer. Alternatively, when MO data or MO signaling occurs, the application layer (or IMS layer) may provide access control start indication/information to the NAS layer instead of determining whether to apply the barring check. In this case, the application layer (or IMS layer) may not receive access control related information/parameter from the AS layer (i.e., RRC layer).

The NAS layer generates an NAS signaling request (e.g., an NAS signaling request for the SM procedure) for MO data or MO signaling and transfers the NAS signaling request to the AS layer (i.e., RRC layer). In this case, the NAS layer determines an access category for the NAS signaling request (e.g., NAS signaling request for the SM procedure) and transfers the determined access category to the AS layer (i.e., RRC layer).

The AS layer (i.e., RRC layer) performs a barring check for access control based on the access category received from the NAS layer and the access category related information/parameter received from the network node (e.g., base stations).

In the foregoing description, a more detailed description of determination of an access category by the NAS layer and a barring check by the AS layer (i.e., RRC layer) adapts the description of the first disclosure to the third disclosure.

When passing is determined instead of barring as a result of the barring check, the AS layer (i.e., RRC layer) may transmit an RRC message including the NAS signaling request (e.g., NAS signaling request for the SM procedure) to the base station/network.

In this case, the AS layer (i.e., RRC layer) may include the access category in the RRC message. Alternatively, after determining a call type and/or an RRC establishment cause based on the access category, the AS layer (i.e., RRC layer) may include the determined call type and/or RRC establishment cause in the RRC message. That is, the RRC message may include the determined call type and/or RRC establishment cause. Alternatively, the RRC message may include the access category, the determined call type and/or RRC establishment cause. Because the UE is in an RRC connected mode (or RRC inactive mode), the RRC message may be one of an RRC connection setup complete message, an RRC connection resume complete message, an RRC connection reestablishment complete message, an RRC connection reconfiguration complete message, an RRC active request or complete message, an RRC inactive request or complete message, a UE capability information message, a UL information transfer messages, or a new RRC message for RRC connected mode.

When barring is determined as a result of the barring check, the AS layer (i.e., RRC layer) of the UE may provide a failure indication to the NAS layer and/or the application layer (or IMS layer). Alternatively, the AS layer (i.e., RRC layer) may provide the failure indication to the application layer (or IMS layer) through the NAS layer.

The barring timer is driven. The barring timer may be driven for each PDU session and/or each NAS signaling request.

Thereafter, when the barring timer has expired, the AS layer (i.e., RRC layer) may provide a barring alleviation indication to the NAS layer and/or the application layer (or IMS layer). Alternatively, the AS layer (i.e., RRC layer) may provide the barring alleviation indication to the application layer (or IMS layer) through the NAS layer. Until receiving the barring alleviation indication, the application layer (or IMS layer) layer cannot transfer MO data or MO signaling to the NAS layer. Further, until receiving the barring alleviation indication, the NAS layer cannot transmit an NAS signaling request to the AS layer (i.e., RRC layer).

When transmission of MO data or MO signaling is complete (when a session is terminated), the application layer/IMS layer of the UE transmits access control stop/end indication/information to the NAS layer and/or AS layer (i.e., RRC layer) of the UE. The indication/information means that access control of MO data or MO signaling through the corresponding session has ended. Here, access control start/begin indication/information and the access control stop/end indication/information may be applied for each PDU session and/or each NAS signaling request. Further, even when the application layer (or IMS layer) does not receive access control related information/parameter from the AS layer (i.e., RRC layer) or the NAS layer, when wanting to start or end transmission of an MO data or MO signaling request, the application layer may provide the access control start indication/information and the access control stop/end indication/information to the NAS layer of the UE.

Here, the barring check for access control may perform MO data or MO signaling for each session (or for each DNN, for each ID of the application, or for each other parameter). Here, each session is mapped to a single access category and thus the access control of the present invention may be applied.

The application layer of the UE may perform an operation of general MO data or MO signaling, and the IMS layer of the UE may perform an operation of MMTEL voice, MMTEL video, and SMS over IP.

IV-2. Second Scheme

FIG. 20 is a signal flow diagram illustrating an exemplary procedure according to a second scheme of a fourth disclosure.

When the AS layer (i.e., RRC layer) of the UE receives access control related information/parameter (e.g., barring ratio, setup information on whether barring is applied (ON/OFF)) from the base station/network, the AS layer may transfer the information to the application layer (or IMS layer) of the UE. In this case, the AS layer (i.e., RRC layer) may transfer the access control related information/parameter to the application layer (or IMS layer) through the NAS layer.

When MO data or MO signaling occurs and when the access control related information/parameter is received from the AS layer (i.e., RRC layer)/NAS layer, the application layer (or IMS layer) may check whether to apply a barring check for access control. When it is necessary to apply the barring check, the application layer (or IMS layer) may provide the access control start indication/information to the NAS layer. Alternatively, when MO data or MO signaling occurs, the application layer (or IMS layer) may provide the access control start indication/information to the NAS layer instead of determining whether to apply the barring check.

The application layer (or IMS layer) may receive an access category from the NAS layer. Alternatively, the application layer may receive an access control access category from the NAS layer regardless of whether the access control is applied.

The application layer (or IMS layer) of the UE may directly perform a barring check for access control based on the received information. In the foregoing description, a more detailed description about a barring check and determination of an access category by the NAS layer adapt the description of the first disclosure to the third disclosure.

When passing is determined instead of barring as a result of the barring check, the application layer (or IMS layer) transfers MO data or MO signaling to the NAS layer. Therefore, the NAS layer generates an NAS signaling request (e.g., 5G SM signaling request) for MO data or MO signaling and transfers the NAS signaling request to the AS layer (i.e., RRC layer). Therefore, the AS layer (i.e., RRC layer) may transmit an RRC message including the NAS signaling request to the base station/network. In this case, the AS layer (i.e., RRC layer) may include the access category in the RRC message. Alternatively, the AS layer (i.e., RRC layer) may determine a call type and/or an RRC establishment cause based on the access category and include the determined call type and/or RRC establishment cause in the RRC message. That is, the RRC message may include the determined call type and/or RRC establishment cause. Alternatively, the RRC message may include the access category and the determined call type and/or RRC establishment cause. Because the UE is in an RRC connected mode (or RRC inactive mode), the RRC message may be one of an RRC connection setup complete message, an RRC connection resume complete message, an RRC connection reestablishment complete message, an RRC connection reconfiguration complete message, an RRC active request or complete message, an RRC inactive request or complete message, an RRC UE capability information message, a UL information transfer messages, or a new RRC message for an RRC connected mode.

When barring is determined as a result of the barring check, a barring timer is driven. The barring timer may be driven for each PDU session and/or each NAS signaling request.

Until the barring timer has expired, the application layer (or IMS layer) layer cannot transfer MO data or MO signaling to the NAS layer. Further, until the barring timer has expired, the NAS layer cannot transmit an NAS signaling request to the AS layer (i.e., RRC layer).

A barring check for the above-described access control may be performed for MO data or MO signaling for each session (or for each DNN, each ID of an application, or each other parameter). Here, each session may be mapped to a single access category and thus the access control of the present invention may be applied thereto.

The application layer of the UE may perform the operation of general MO data or MO signaling, and the IMS layer of the UE may perform an operation of an MMTEL voice, MMTEL video, and SMS over IP.

IV-3. Third Scheme

The NAS signaling request message described in the first scheme and the second scheme may be divided into an NAS signaling request message for the MM procedure and an NAS signaling request message for the SM procedure. The NAS layer may be divided into an MM entity for the MM procedure and an SM procedure for the SM procedure. In this case, access control of the NAS signaling request message for the MM procedure may be performed by the MM entity of the NAS layer of the UE. The access control of the signaling request message for the SM procedure may be performed by the SM entity of the NAS layer of the UE. In this case, the AS layer (i.e., RRC layer) may drive a barring timer for each of the MM procedure and the SM procedure. The AS layer (i.e., RRC layer) may transfer failure indication/information and barring alleviation indication/information to the MM entity and the SM entity, respectively of the NAS layer.

The description described in the third scheme may be applied to the first disclosure to the sixth disclosure of the present specification.

V. Fifth Disclosure

The fifth disclosure provides a scheme of performing an access control operation for each slice and/or each UE. A scheme according to the fifth disclosure to be described later may be applied to the first disclosure to the fourth disclosure.

Here, to perform a barring check for access control for each slice (or each network slice) and for each UE means that the AS layer (i.e., RRC layer) of the UE performs a barring check for access control based on slice (or network slice) related information, i.e., Single Network Slice Selection Assistance information (S-NSSAI) or Slice/Service type (SST) or Slice Differentiator (SD) information.

V-1. First Scheme

A network node (e.g., core network node or base station) provides access control related parameter information (e.g., barring rate) to the AS layer (i.e., RRC layer) of the UE through the SIB for each S-NSSAI (and for each PLMN).

When the NAS layer of the UE sends an NAS signaling request message for MO data or MO signaling to the AS layer (i.e., RRC layer), the NAS layer together provides S-NSSAI information (e.g., S-NSSAI #1) of the corresponding NAS signaling request message (or the corresponding PDU session). Therefore, when the AS layer (i.e., RRC layer) of the UE performs a barring check of the NAS signaling request message (NAS signaling request for the MM procedure or the SM procedure), the AS layer performs a barring check based on access control related parameter information of S-NSSAI (e.g., S-NSSAI #1) provided from the NAS layer and the corresponding S-NSSAI (e.g., S-NSSAI #1) received from the base station.

When barring is determined as a result of the barring check, the AS layer (i.e., RRC layer) of the UE drives a barring timer of the corresponding S-NSSAI (e.g., S-NSSAI #1) and transfers a failure indication of the corresponding S-NSSAI (e.g., S-NSSAI #1) to the NAS layer.

Until receiving barring alleviation indication/information of the corresponding S-NSSAI (e.g., S-NSSAI #1) from the AS layer (i.e., RRC layer), the NAS layer does not transmit an NAS signaling request message of the same S-NSSAI (e.g., S-NSSAI #1) to the AS layer (i.e., RRC layer). However, the NAS layer may transmit an NAS signaling request message of another S-NSSI (e.g., S-NSSAI #2) to the AS layer (i.e., RRC layer).

When the barring timer of the corresponding S-NSSAI (e.g., S-NSSAI #1) has expired, the AS layer (i.e., RRC layer) provides barring alleviation indication/information of the corresponding S-NSSAI (e.g., S-NSSAI #1) to the NAS layer.

In this way, according to the first scheme, a process of a barring check, a barring timer, a barring ratio, a barring alleviation indication/information, and a NAS signaling request message for access control is operated for each S-NSSAI (and PLMN).

V-2. Second Scheme

The network node (e.g., core network node or base station) provides access control related parameter information (e.g., barring rate) for each SST (for each PLMN) to the AS layer (i.e., RRC layer) of the UE through the SIB.

When the NAS layer of the UE sends a NAS signaling request message for MO data or MO signaling to the AS layer (i.e., RRC layer), the NAS layer together provides SST information (e.g., SST #1) of the corresponding NAS signaling request message (or the corresponding PDU session). Therefore, when the AS layer (i.e., RRC layer) of the UE performs a barring check of the NAS signaling request message (NAS signaling request for the MM procedure or the SM procedure), the AS layer performs a barring check based on SST information (e.g., SST #1) provided in the NAS layer and access control related parameter information of the corresponding SST information (e.g., SST #1) received from the base station.

When barring is determined as a result of the barring check, the AS layer (i.e., RRC layer) of the UE drives the barring timer of the corresponding SST (e.g., SST #1) and transfers a failure indication of the corresponding SST (e.g., the SST #1) to the NAS layer.

Until receiving barring alleviation indication/information of the corresponding SST (e.g., SST #1) from the AS layer (i.e., RRC layer), the NAS layer does not send an NAS signaling request message of the same SST (e.g., SST #1) to the AS layer (i.e., RRC layer). However, the NAS layer may transmit an NAS signaling request message of another SST (e.g., SST #2) to the AS layer (i.e., RRC layer).

When the barring timer of the corresponding SST (e.g., SST #1) has expired, the AS layer (i.e., RRC layer) provides a barring alleviation indication/information of the corresponding SST (e.g., SST #1) to the NAS layer.

In this way, according to the second scheme, a process of a barring check, a barring timer, a barring ratio, barring alleviation indication/information, and an NAS signaling request message for access control is performed for each SST (and PLMN).

V-3. Third Scheme

The access control operation described in the first disclosure to the fourth disclosure may be performed for each slice (or for each network slice) and/or for each DDN and/or for each UE.

Here, a barring check of access control for each slice (or network slice) and for each DNN (and each UE) is performed as follows. First, in a first process, the AS layer (i.e., RRC layer) of the UE performs a barring check for access control based on slice (or network slice) related information, i.e., S-NSSAI, Slice/Service type (SST), or Slice Differentiator (SD) information. When passing is determined instead of barring as a result of the barring check, in a second process, the AS layer (i.e., RRC layer) performs a barring check for access control based on DNN information. However, when barring is determined as a result of the barring check, the AS layer (i.e., RRC layer) may provide failure indication (including failure cause value/information) (e.g., a cell is barred due to a slice failure) to a superordinate layer (e.g., NAS layer or IMS layer). Further, a first barring check is successful/passed by passing instead of barring as a result of the first barring check, but when a second barring check is failed by barring as a result of the second barring check, the AS layer (i.e., RRC layer) may provide a fail indication (including a failure cause value/information) (e.g., a cell is barred due to a DNN failure) to a superordinate layer (e.g. NAS layer or IMS layer).

Therefore, only when all results of the barring check based on slice and DNN information are successful/passed, an NAS signaling request may be transferred to the network.

An access control operation described in the above-described first to fourth disclosures may be performed for each specific criterion (e.g., for each parameter/information/ UE).

For example, the criterion may be a slice (network slice), DNN, QCI, QFI, application ID (App-ID with OS-ID) or the like. Here, it may be determined according to the network/operator policy whether to perform an access control operation based on which one. When an access control operation is performed based on a plurality of criteria, if passing is determined as a result of the barring check based on a first criterion, the barring check may be performed based on a second criterion. When a barring check according to any criterion is failed, fail indication/information (including failure cause information/value) may be provided to a superordinate layer (NAS layer or IMS layer) instead of performing a subsequent barring check based on the criterion.

Accordingly, when a barring check by all criteria is successfully passed, an NAS signaling request may be sent to the network.

VI. Sixth Disclosure

The access control operations described in the first disclosure to the fifth disclosure is combined with a description according to the sixth disclosure to be improved as follows.

VI-1. First Scheme

When the AS layer (i.e., RRC layer) of the UE receives access control related information/parameter from a network node, the AS layer (i.e., RRC layer) provides the access control related information/parameter to the NAS layer or the application layer (e.g., IMS layer or MMTEL layer). Thereafter, when a request for data/signaling, MMTEL signaling (MMTEL voice, MMTEL video, and MMTEL signaling for SMS over IP) to transmit occurs, the application layer (e.g., IMS layer or MMTEL layer) transfers the request to the NAS layer of the UE. In this case, a start/stop indication of the session may be together transferred. Thereafter, the NAS layer of the UE determines an access category according to the description of the first disclosure to the fifth disclosure. An access barring check is performed. Specifically, the barring check may be performed based on access control related information/parameter from a node provided from the AS layer (i.e., RRC layer) and the access category. When the connection request is passed instead of barring as a result of the barring check, the NAS layer transfers the connection request to the AS layer (i.e., RRC layer). However, when it is determined that the connection request is barred as a result of the barring check, a barring timer of the corresponding access category is driven. While the barring timer is driven, the NAS layer does not transfer the corresponding request to the AS layer (i.e., RRC layer). A failure indication may be provided to the application layer (e.g., IMS layer or MMTEL layer). Therefore, until the barring timer of the corresponding access category has expired, the NAS layer of the UE does not perform a corresponding connection request for the corresponding access category.

In the case of an SMS over NAS layer, because the NAS layer recognizes the corresponding connection request, the NAS layer performs a barring check for access control based on access control related information/parameter provided from the AS layer (i.e., RRC layer) and the determined access category.

When the connection request is passed instead of barring as a result of the barring check, the NAS layer transfers the connection request to the AS layer (i.e., RRC layer). However, when it is determined that the connection request is barred as a result of the barring check, a barring timer of the corresponding access category is driven. While the barring timer is driven, the NAS layer does not transfer the corresponding request to the AS layer (i.e., RRC layer).

The access category determination operation of the NAS layer follows the above-described proposals #1 to #5 of the present invention. A detailed description of the access category determination operation of the NAS layer follows the description of the first disclosure to the fifth disclosure.

VI-2. Second Scheme

In the MMTEL layer (or IMS layer), when MMTEL signaling (MMTEL voice, MMTEL video, and MMTEL signaling for SMS over IP) to transmit occurs, the MMTEL layer (or IMS layer) determines an access category according to the description of the above-described first disclosure to fifth disclosure. The MMTEL layer (or IMS layer) performs a barring check according to the description of the first disclosure to the fifth disclosure. Specifically, a barring check may be performed based on access control related information/parameter from a node provided from the AS layer (i.e., RRC layer) and an access category transferred from the NAS layer.

When the connection request is passed instead of barring as a result of the barring check, the request may be transferred to the AS layer (i.e., RRC layer) through the NAS layer, and the AS layer may transmit the request to the network. However, when it is determined that the connection request is barred as a result of the barring check, a barring timer of the corresponding access category is driven. While the barring timer is driven, the NAS layer does not transfer the corresponding request to the AS layer (i.e., RRC layer). Until the barring timer of the corresponding access category has expired, the MMTEL layer (or IMS layer) does not transfer any request for the same access category to the NAS layer.

The access category determination operation of the MMTEL layer (or IMS layer) follows the above-described proposals #1 to #5 of the present invention. Alternatively, the NAS layer may determine the access category and transfer the access category to the MMTEL layer (or IMS layer).

VI-3. Third Scheme

Table 7 shows an access category.

TABLE 7

| Access category number | Conditions of UE | Type of access attempt |
|---|---|---|
| 0 | All | MO signaling for responding to paging |
| 1 | When one or more of access classes 11 to 15 are set | All |
| 2 | When the UE performs a service having high delay allowance and when the UE is a subject of access control for an access category 2 | All |
| 3 | All cases except for class of access categories 1-2 | Emergency |
| 4 | All cases except for class of access categories 1-2 | MO signaling |
| 5 | All cases except for class of access categories 1-2 | MMTEL voice |
| 6 | All cases except for class of access categories 1-2 | MMTEL video |
| 7 | All cases except for class of access categories 1-2 | SMS |
| 8 | All cases except for class of access categories 1-2 | MO data that do not belong to other access category |

TABLE 7-continued

| Access category number | Conditions of UE | Type of access attempt |
|---|---|---|
| 9-31 | | Reserved access category |
| 32-63 | All cases except for class of access categories 1-2 and all cases except for a class roaming UE | Operator's access |

FIGS. 21a to 21d are diagrams illustrating operations of each layer.

Figure 21A:
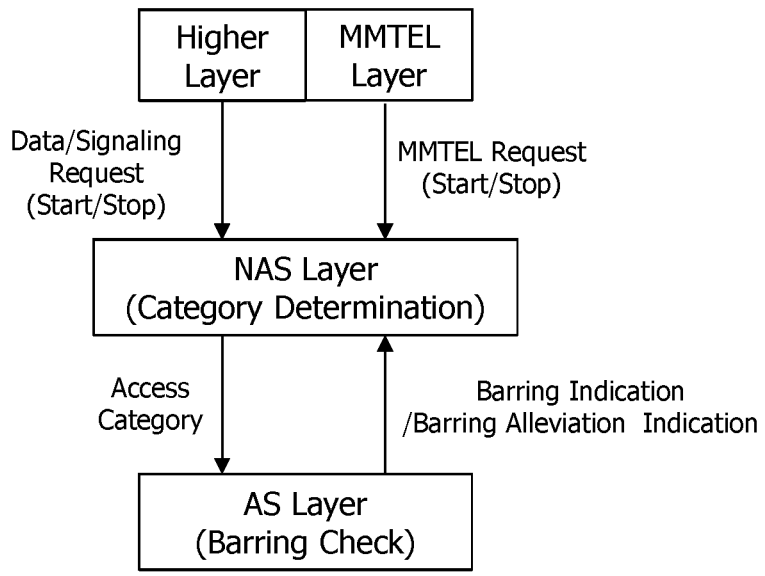
FIGS. 21a to 21d are diagrams illustrating operations of each layer.

Referring to FIG. 21a, the NAS layer may determine an access category, and the AS layer may perform a barring check.

Figure 21B:
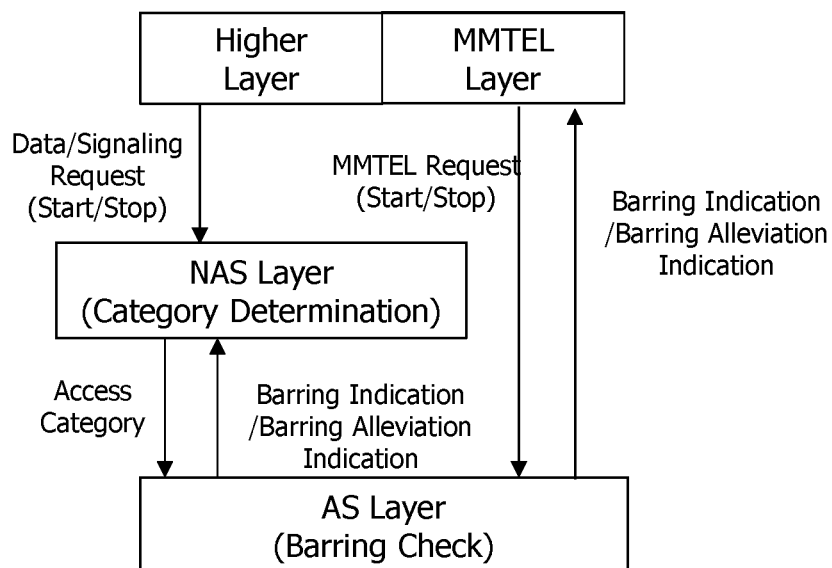

Referring to FIG. 21b, the NAS layer may determine an access category, and the AS layer may perform a barring check. However, for the MMTEL request, the MMTEL layer may determine an access category, and the AS layer may perform a barring check.

Figure 21C:
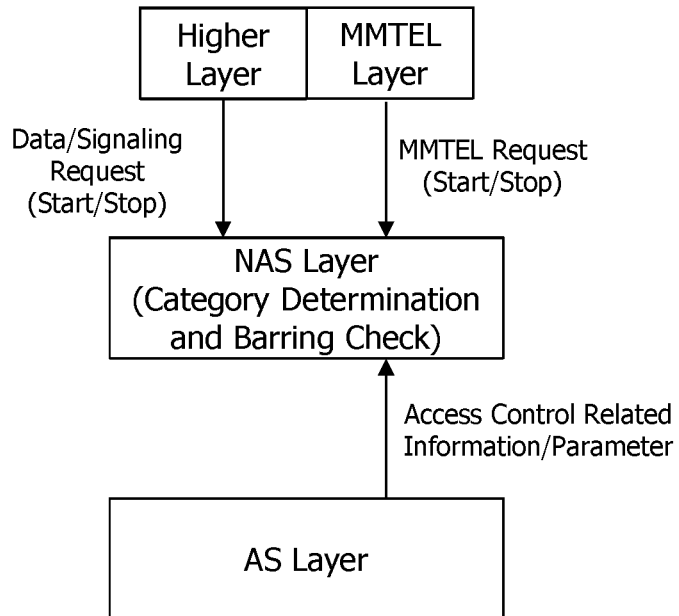

Referring to FIG. 21c, the AS layer provides access control related information/parameter to the NAS layer. The NAS layer may determine an access category and perform a barring check.

Figure 21D:
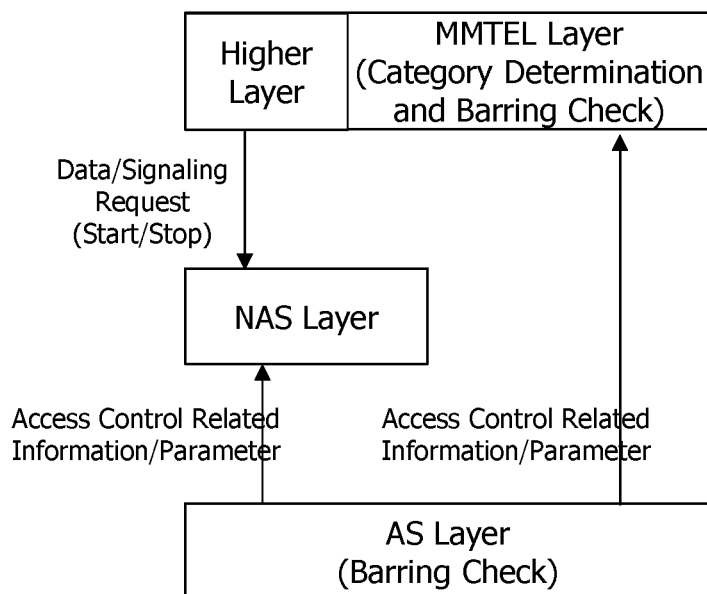

Referring to FIG. 21d, the AS layer provides access control related information/parameter to the NAS layer and the MMTEL layer. The NAS layer may determine an access category and perform a barring check. However, for the MMTEL request, the MMTEL layer may determine an access category, and the AS layer may perform a barring check.

VI-4. Fourth Scheme

The UE described in the first disclosure to the sixth disclosure may receive access control related information such as access category mapping information, barring information, and UE setup information through OMA DM based MO and/or SIB and/or NAS signaling procedure (e.g. initial) registration procedure, moving and periodic registration update procedure, UE setup update procedure) and/or (pre-configured) USIM/SIM from the network. In this case, the IMS layer, the NAS layer, and the AS layer (i.e., RRC layer) of the UE may transfer/provide information received from the network to other layers (e.g., IMS layer, NAS layer, RRC layer). The UE may obtain information provided from the network node through the AT-command.

Further, the network node may be any one entity or several entities of an AMF, SMF, (R)AN, a base station (e.g., gNodeB), UPF, UDM, NSSF, AUSF, and PCF.

VI-5. Fifth Scheme

In the description described in the first to sixth disclosures, the IMS request message and/or the NAS signaling request message and the RRC signaling request message are distinguished to perform a barring check. Access category determination for the IMS request message and/or the NAS signaling request message and execution of the barring check for access control follow the description described in the first to sixth disclosures.

A barring check to be performed by the AS layer (e.g., RRC layer) may be changed as follows.

First, the UE may obtain access control related information/parameters such as access category and access category mapping information, barring information, and UE setup information from a network node through OMA DM based MO and/or SIB and/or NAS signaling procedure and/or a USIM/SIM. Further, the IMS layer and/or the NAS layer of the UE may obtain access control related information/ parameter through the OMA DM based MO and/or SIB and/or NAS signaling procedure.

Thereafter, when an RRC signaling request is required, in order to obtain access category mapping information on the corresponding RRC signaling request, the AS layer (i.e., RRC layer) may request the RRC signaling request to the NAS layer and/or the IMS layer. Thereafter, the NAS layer and/or the IMS layer may provide the access control related information (including access category mapping information) to the AS layer (i.e., RRC layer). Alternatively, the NAS layer and/or the IMS layer may in advance provide the access control related information (including access category mapping information) to the AS layer (i.e., RRC layer). Alternatively, the AS layer (i.e., RRC layer) may obtain the access control related information (including the access category mapping information) received from the NAS layer and/or the IMS layer or the network using an AT-command Thereafter, the AS layer (i.e., RRC layer) determines an access category for the corresponding RRC signaling request based on the received access control related information (including access category mapping information) and performs a barring check. A detailed description about the barring check applies the description of the above-described first to sixth disclosures.

In order to obtain access category mapping information, when the AS layer (i.e., RRC layer) requests the access category mapping information to the NAS layer and/or the IMS layer, the AS layer (i.e., RRC layer) may include and request information about an RRC signaling request.

When a plurality of access categories are determined by the RRC signaling request, a highest access category or a lowest access category may be selected. Therefore, a barring check may be performed based on the highest access category or the lowest access category.

Here, the RRC signaling request message means an RRC signaling request message, for example, an RRC connection resume request message, an RRC connection setup complete message, an RRC connection reconfiguration message, an RRC connection request message, a UL information transfer message, and a UE capability information message requested by an independent operation of an RRC layer instead of an RRC signaling request initiated by an IMS/NAS signaling request.

The description of the above-described first disclosure to the sixth disclosure may be used in combination.

The foregoing descriptions may be implemented in hardware. This will be described with reference to the drawings.

Figure 22:
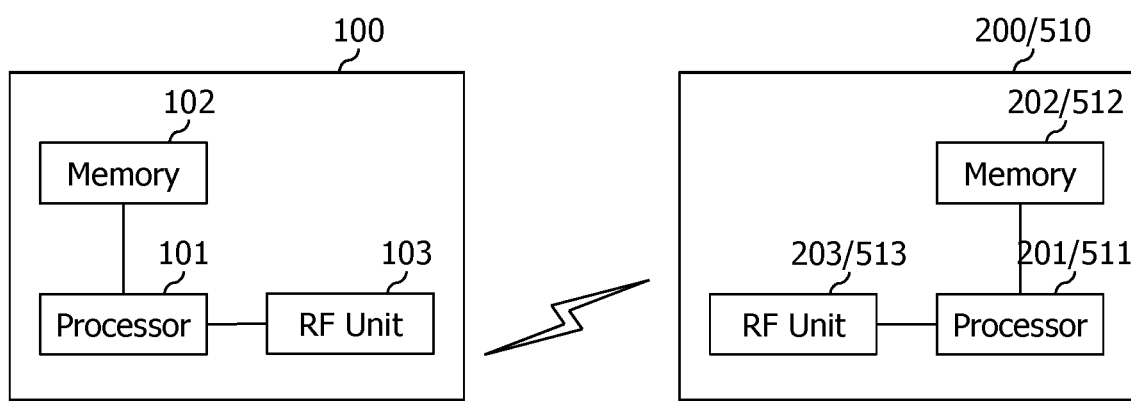
FIG. 22 is a block diagram illustrating a configuration of a UE and a network device according to an embodiment of the present invention.

FIG. 22 is a block diagram illustrating a configuration of a UE and a network device according to an embodiment of the present invention.

As shown in FIG. 22, the UE includes a processor 101, a memory 102, and a transceiver 103. The network device 200 or 510 includes a processor 201 or 511 and a memory 202 or 512, and a transceiver 203 or 513.

The memories 102 and 202 or 512 store the above-described method.

The processors 101 and 201 or 511 control the memories 102 and 202 or 512 and the transceivers 103 and 203 or 513, respectively. Specifically, the processors 101 and 201 or 511 execute each of the above methods stored in the memories 102 and 202 or 512. The processors 101 and 201 or 511 transmit the above-mentioned signals through the transceivers 103 and 203 or 513.

While the present invention has been described with reference to exemplary embodiments, it is to be understood that the present invention is not limited to the disclosed exemplary embodiments, but may be modified, changed, or improved in various forms within the spirit of the present invention and the scope described in claims.

What is claimed is:

1. A method of performing access control by a terminal, the method comprising:
transmitting, based on a determination to not bar as a result of a barring check for access control, by an Access Stratum (AS) layer of a terminal, a Radio Resource Control (RRC) message comprising at least one of an access category, a call type, and an establishment cause to a base station; and
receiving a RRC reject message or an RRC disconnection message from the base station in a network overload or congestion situation;
requesting and obtaining, by the AS layer of the terminal, access category mapping information to a Non-Access Stratum (NAS) layer of the terminal, based on the transmission of the RRC message being required;
determining, by the AS layer of the terminal, an access category of the RRC message based on the access category mapping information obtained from the NAS layer;
wherein the at least one of the access category, the call type, and the establishment cause is included in the RRC message based on the base station determining whether to transmit the RRC reject message or the RRC disconnection message in the network overload or congestion situation,
wherein transmission of the RRC message is independently requested by the AS layer of the terminal based on a transmission of an NAS signaling request message not being requested from the NAS layer of the terminal.

2. The method of claim 1, further comprising:
receiving, by the AS layer of the terminal, access control related information from the base station;
independently obtaining, by the AS layer of the terminal, access category mapping information based on the access control related information received from the base station, based on the transmission of the RRC message being required; and
determining, by the AS layer of the terminal, an access category of the RRC message based on the independently obtained access category mapping information.

3. The method of claim 1, further comprising:
transferring, by the AS layer of the terminal, information on radio access technology (RAT) of the currently accessed base station to an NAS layer of the terminal;
transferring, by the NAS layer, at least one of the call type and the establishment cause to the AS layer, based on the RAT of the base station being long term evaluation (LTE) or LTE-Advanced; and
transferring, by the NAS layer, the access category to the AS layer, based on the RAT of the base station being new RAT (NR).

4. The method of claim 1, further comprising:
performing, by the AS layer of the terminal, a barring check for access control based on at least one of the call type and the establishment cause, based on at least one of the call type and the establishment cause being obtained from the NAS layer; and
performing, by the AS layer of the terminal, a barring check for access control based on the access category, and based on the access category being obtained from the NAS layer.

5. The method of claim 1, further comprising:
determining, based on a RAT of the currently accessed base station being LTE or LTE-Advanced, and based on an access category being obtained from the NAS layer, by the AS layer, at least one of the call type and the establishment cause based on the access category.

6. The method of claim 1, wherein the RRC reject message or the RRC disconnection message is transmitted from the base station based on the base station receiving an overload control start command in the network overload or congestion situation.

7. The method of claim 1, further comprising:
driving, based on the RRC reject message or the RRC disconnection message comprising a wait time value, by the AS layer, a timer based on the wait time value.

8. The method of claim 7, further comprising:
transferring, by the AS layer, a rejection indication or a failure indication comprising the wait time value to the NAS layer; and
driving, the NAS layer, the timer based on the wait time value.

9. The method of claim 1, further comprising:
receiving, by the AS layer, the access control related information from the network, wherein the access control related information is further considered in the barring check for access control.

10. A terminal for performing access control, the terminal comprising:
a transceiver; and
a processor configured to control the transceiver and drive an Access Stratum (AS) layer and a Non-Access Stratum (NAS) layer,
wherein the AS layer transmits a Radio Resource Control (RRC) message comprising at least one of an access category, a call type, and an establishment cause to a base station, based on a determination not to bar as a result of a barring check for access control,
wherein the AS layer receives an RRC reject message or an RRC disconnection message from the base station in a network overload or congestion situation,
wherein the AS layer requests and obtains access category mapping information to a Non-Access Stratum (NAS) layer of the terminal, based on the transmission of the RRC message being required; and
wherein the AS layer determines an access category of the RRC message based on the access category mapping information obtained from the NAS, and
wherein at least one of the access category, the call type, and the establishment cause is included in the RRC message based on the base station determining whether to transmit the RRC reject message or RRC disconnection message in the network overload or congestion situation,
wherein transmission of the RRC message is independently requested by the AS layer of the terminal based on a transmission of a NAS signaling request message not being requested from the NAS layer of the terminal.

* * * * *